United States Patent
Suzuki

(10) Patent No.: US 8,150,434 B2
(45) Date of Patent: Apr. 3, 2012

(54) LEADERSHIP SUPPORT SYSTEM DETERMINING A DANGER OF ISOLATION OF A GROUP MEMBER EVEN UNDER TEMPORARILY WORSENED COMMUNICATION CONDITIONS

(75) Inventor: Yusuke Suzuki, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 1071 days.

(21) Appl. No.: 12/071,013

(22) Filed: Feb. 14, 2008

(65) Prior Publication Data

US 2008/0201164 A1 Aug. 21, 2008

(30) Foreign Application Priority Data

Feb. 19, 2007 (JP) ................................. 2007-037509

(51) Int. Cl.
*H04B 7/00* (2006.01)
*H04W 24/00* (2009.01)
(52) U.S. Cl. .................... 455/507; 455/456.1; 340/573.1
(58) Field of Classification Search .................. 455/507, 455/456.1, 436, 456.5, 404.2, 456.3, 517; 340/573.4, 573.1, 988, 539.13; 342/357.75, 357.55, 357.31, 30

See application file for complete search history.

(56) References Cited

U.S. PATENT DOCUMENTS

2005/0054351 A1 * 3/2005 McAlexander ............ 455/456.1

FOREIGN PATENT DOCUMENTS

| JP | 3039198 | 4/1997 |
| JP | 2001099928 A | 4/2001 |
| JP | 2006-054787 | 2/2006 |
| WO | WO-2005/020172 A1 | 3/2005 |

* cited by examiner

*Primary Examiner* — Kiet Doan
(74) *Attorney, Agent, or Firm* — Rabin & Berdo, P.C.

(57) ABSTRACT

A leadership support system includes a leader terminal and plural member terminals. The member terminals, according to either the relay of communication information not addressed thereto or the reception of communication information addressed thereto, send back a response to the appropriate communication information. The leader terminal determines, based on the times of relaying the communication information, whether or not the member terminal that transmitted the communication information is in danger of isolation. When the leader terminal determines the member terminal in danger of isolation, it outputs a warning signal indicative of a ranger of isolation to that member terminal.

6 Claims, 25 Drawing Sheets

FIG.2

| TERMINAL ID (42) | REGISTRATION TIME (44) | LATEST ACCESS TIME (46) | NUMBER OF RETAINED NODES (48) |
|---|---|---|---|
| 1 | 2006/12/27 10:00 | 2006/12/27 10:15 | 3 |
| 2 | 2006/12/27 10:00 | 2006/12/27 10:05 | 4 |
| 72 | 2006/12/27 10:00 | 2006/12/27 10:05 | 5 |

FIG. 5A

TERMINAL ID TRANSMISSION REQUEST : 54

| REQUEST TYPE 1 | REQUEST SOURCE TERMINAL ID |
|---|---|
| 56 | 58 |

FIG. 5B

CONNECTION POSSIBILITY CONFIRMATION REQUEST : 60

| REQUEST TYPE 2 | DESTINATION TERMINAL ID | REQUEST SOURCE TERMINAL ID |
|---|---|---|
| 62 | 64 | 66 |

FIG. 5C

CONNECTION CONFIRMATION REPLY : 68

| REPLY TYPE 2 | REPLY REQUEST TERMINAL ID | REPLY TERMINAL ID | NODE NUMBER OF REPLY TERMINALS |
|---|---|---|---|
| 70 | 72 | 74 | 76 |

FIG. 5D

TERMINAL ID REPLY : 78

| REPLY TYPE 1 | REQUEST SOURCE TERMINAL ID | OWN TERMINAL ID | NUMBER OF OWN TERMINAL NODES |
|---|---|---|---|
| 80 | 82 | 84 | 86 |

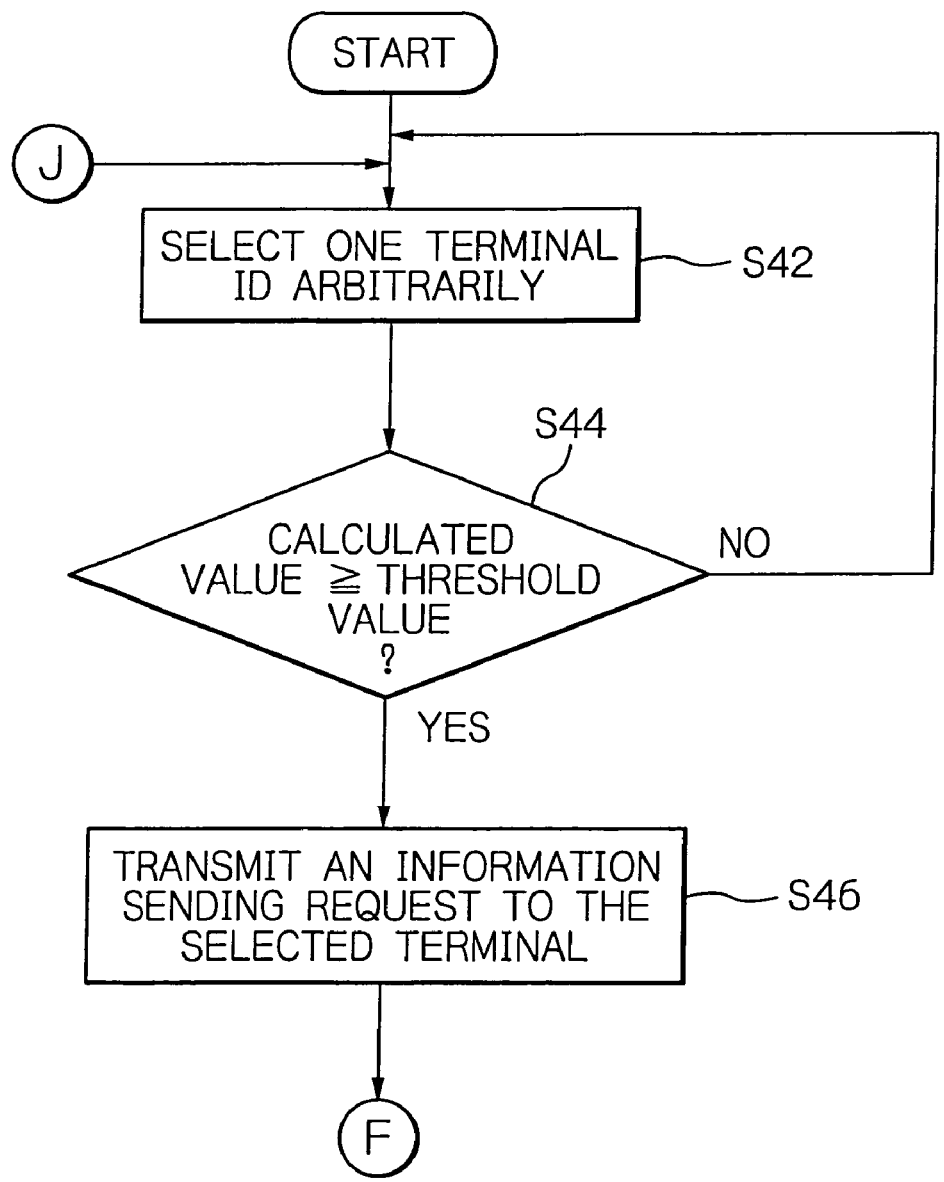

FIG. 9A
INFORMATION SENDING REQUEST: 88

| INFORMATION SENDING REQUEST FLAG | INFORMATION SENDING REQUEST ID | NUMBER OF HOPS | RELAY TERMINAL ID | TRANSFER DESTINATION TERMINAL ID | REQUEST SOURCE TERMINAL ID |
|---|---|---|---|---|---|
| 90 | 92 | 94 | 96 | 98 100 | 102 |

FIG. 9B
INFORMATION SENDING RESPONSE: 104

| INFORMATION SENDING RESPONSE FLAG | INFORMATION SENDING REQUEST ID | NUMBER OF HOPS | TEMPORARY NUMBER OF HOPS | RELAY TERMINAL ID | TRANSFER TERMINAL ID | DESTINATION TERMINAL ID | RESPONSE TERMINAL ID |
|---|---|---|---|---|---|---|---|
| 90 | 92 | 94 | 106 | 96 | 98 | 100 | 108 |

FIG. 9C
WARNING DATA: 110

| WARNING FLAG | WARNING ID | RELAY TERMINAL ID | TRANSFER TERMINAL ID | DESTINATION TERMINAL ID | RESPONSE TERMINAL ID |
|---|---|---|---|---|---|
| 112 | 114 | 96 | 98 | 100 | 108 |

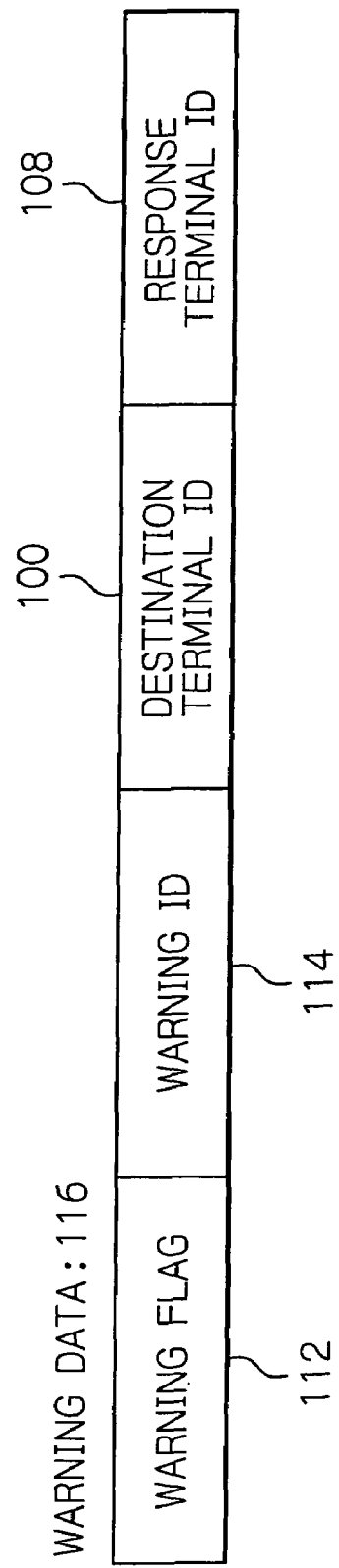

LEADERSHIP SUPPORT SYSTEM DETERMINING A DANGER OF ISOLATION OF A GROUP MEMBER EVEN UNDER TEMPORARILY WORSENED COMMUNICATION CONDITIONS

BACKGROUND OF THE INVENTION

1. Field of the Invention

The present invention relates to a leadership support system, and more particularly to a leadership support system that warns a danger of isolation on a radio communication between a leader and a member of the system, a leadership support terminal constituting the system, and a method therefor.

2. Description of the Background Art

Conventional leadership support terminals are described in Japanese patent laid-open publication No. 2006-54787 by way of example. The leadership support terminals constitute, together with one or more IC (Integrated Circuit) radio tags, a leadership supervision system for confirming a person or persons. In the leadership supervision system, it has been proposed that a radio IC tag carried by each of the respective moving persons outputs a predetermined signal; a memory device in the radio mobile terminal stores personal information of each moving person and a signal made correspondent to the personal information; a receiver receives a signal from the radio IC tag; the memory device is searched to specify personal information based on the received signal; a signal determiner determines whether or not there is a moving person who matches with the specified personal information corresponding to the stored information of the memory device; and an output unit transmits determination results.

However, in the conventional leadership support terminal, in order to determine whether or not a member of a group, i.e. a moving person is in danger of isolation, it is determined as the presence or absence of a group member whether or not radio waves are sensed in the communication between the radio IC tag carried by the member and the radio mobile terminal carried by the leader.

Because of this, for example, in the case where communication conditions are temporarily worsened when a person carrying the conventional leadership support terminal walks into a room so that radio waves are shut off by its structure, the terminal will incorrectly determine that the member is in danger of isolation. Consequently, this terminal will be easily influenced by the determination of isolation.

Besides, the conventional leadership support terminal determines only the presence or absence of a member by the presence or absence of the arrival of radio waves in the communication between the radio IC tag carried by the member and the radio mobile terminal carried by the leader, so that it cannot determine whether or not a member is in a situation of being easily isolated.

SUMMARY OF THE INVENTION

It is an object of the present invention to provide a leadership support terminal that is capable of determining the danger of isolation of a member carrying the terminal without being influenced even when communication conditions are temporarily worsened.

In accordance with the present invention, there is provided a leadership support method in a wireless network of nodes, each of which comprises a leadership support terminal for relaying communication information for use in supervision of leadership, wherein at least one of the leadership support terminals is carried as a leader terminal by a leader of a group, and remaining ones of the leadership support terminals are carried as member terminals by members of the group, of which movement is supervised. The method comprises: a first step of recording a plurality of pieces of terminal identification information of the member terminals in the leader terminal, and transmitting an information request contained in the communication information addressed to ones of the member terminals corresponding to the plurality of pieces of terminal identification information recorded in the leader terminal; a second step of, in the member terminals, relaying the communication information not addressed to the member terminal or receiving the communication information addressed to the leader terminal, and sending back communication information containing an information response to the received communication information; and a third step of determining, in the leader terminal, based on a number of times of relaying the communication information, whether or not the member terminal that transmitted the communication information is in danger of isolation, and outputting, when the member terminal is determined to be in danger of isolation, a warning to the determined member terminal.

In the leadership support method of the present invention, at least one leadership support terminal, in which a plurality of pieces of terminal identification information of the plurality of leadership support terminals are recorded, is set as a leader terminal, and an information request contained in the communication information is transmitted to the leadership support terminals corresponding to the plurality of pieces of terminal identification information recorded in the leader terminal. The member terminal performs either relay of the communication information not addressed to the member terminal or reception of the communication information addressed to the member terminal, and sends back communication information containing an information response to the received communication information. The leader terminal determines, based on a number of times of relaying the communication information, whether or not the member terminal that transmitted the communication information is in danger of isolation, and outputs, when the member terminal is determined to be in danger of isolation, a warning to the determined leadership support terminal. Thus, the leadership support method determines the presence or absence of the danger of isolation of the leadership support terminal by the communication information that is transmitted and received between the leadership support terminals. Consequently, the method is able to determine the danger of isolation of a member carrying the leadership support terminal without being influenced by temporary worsening of communication conditions, thereby preventing dangers involved in isolation.

In accordance with the present invention, there is provided another leadership support method in a wireless network of nodes, each of which comprises a leadership support terminal for relaying communication information for use in supervision of leadership, for supervising movement of a user carrying the leadership support terminal. The leadership support method comprises: a first step of detecting one of the leadership support terminals which is directly communicable with another of the leadership support terminals; and a second step of determining, based on a number of directly communicable leadership support terminals detected, whether or not the one leadership support terminal is in danger of isolation, and outputting, when the leadership support terminal is determined to be in danger of isolation, a warning to the determined leadership support terminal.

In the leadership support method of the present invention, one of the plurality of leadership support terminals which is directly communicable with another leadership support terminal is detected. Based on a number of directly communicable leadership support terminals detected, it is determined whether or not the leadership support terminal is in danger of isolation. When the leadership support terminal is determined to be in danger of isolation, a warning to the one determined leadership support terminal is output. Thus, the leadership support method determines the presence or absence of the danger of isolation of the leadership support terminal by the communication information that is transmitted and received between the leadership support terminals. Consequently, the method is able to determine the danger of isolation of a member carrying the leadership support terminal without being influenced by temporary worsening of communication conditions, thereby preventing dangers involved in isolation.

In accordance with the present invention, there is provided a leadership support system in a wireless network of nodes, each of which comprises a leadership support terminal for relaying communication information for use in supervision of leadership, wherein at least one of the leadership support terminals is carried as a leader terminal by a leader of a group, and remaining ones of the leadership support terminals are carried as member terminals by members of the group, of which movement is supervised. The leader terminal has a plurality of pieces of terminal identification information of said member terminals recorded, and transmits an information request contained in the communication information addressed to the member terminals corresponding to the plurality of pieces of terminal identification information recorded in the leader terminal. The member terminal sends back a transmission response to the communication information according to relay of the communication information not addressed to the member terminal or reception of the communication information addressed to the member terminal. The leader terminal determines, based on a number of times of relaying the communication information, whether or not the member terminal that transmitted the communication information is in danger of isolation, and outputs a warning indicative of a danger of isolation.

According to the leadership support system of the present invention, it includes one or plurality of leader terminals and a plurality of member terminals. The member terminal, according to either the relay of communication information not addressed thereto or the reception of communication information addressed thereto, sends back a response to this communication information. The leader terminal determines, based on the number of relays of the communication information, whether or not the member terminal that transmitted the communication information is in danger of isolation, and outputs, when it is determined to be in danger of isolation, a warning indicative of a ranger of isolation to that member terminal. Thus, the leadership support system determines the presence or absence of the danger of isolation of the leadership support terminal by the communication information that is transmitted and received between the leadership support terminals. Consequently, the system is able to determine the danger of isolation of a member carrying the leadership support terminal without being influenced by temporary worsening of communication conditions, thereby preventing dangers involved in isolation.

In accordance with the present invention, there is provided another leadership support system in a wireless network of nodes, each of which comprises a leadership support terminal for relaying communication information for use in supervision of leadership, for supervising movement of a user carrying the leadership support terminal. The leadership support terminal is constructed so that it detects one of the plurality of leadership support terminals which is directly communicable with the leadership support terminal, determines, based on a number of directly communicable leadership support terminals detected, presence or absence of a danger of isolation of the leadership support terminal, and outputs a warning indicative of a danger of isolation according to the presence of the danger of isolation.

In the leadership support system of the present invention, the leadership support terminal detects one of the plurality of leadership support terminals which is directly communicable with the leadership support terminal, determines, based on a number of directly communicable leadership support terminals detected, presence or absence of a danger of isolation of the leadership support terminal, and outputs a warning indicative of a danger of isolation according to the presence of the danger of isolation. Thus, the leadership support system determines the presence or absence of the danger of isolation of the leadership support terminal by the communication information that is transmitted and received between the leadership support terminals. Consequently, the system is able to determine the danger of isolation of a member carrying the leadership support terminal without being influenced by temporary worsening of communication conditions, thereby preventing dangers involved in isolation.

In a leadership support system of the present invention in a wireless network of nodes, each of which comprises a leadership support terminal for relaying communication information for use in supervision of leadership, for supervising movement of a user carrying said leadership support terminal, each of said leadership support terminals comprises: a transmitter/receiver for transmitting and receiving the communication information; a data storage in which terminal identification information for identifying other leadership support terminals communicable with the leadership support terminal is recorded; an information analyzer for determining presence or absence of a danger of isolation, based on at least the terminal identification information, recorded in either the communication information or the data storage, which is transmitted and received between the leadership support terminals; and an information presenter for outputting warning information indicative of a danger of isolation according to determination results of the information analyzer.

According to the leadership support terminal of the present invention, the transmitter/receiver transmits and receives the communication information. The data storage stores terminal identification information for identifying other leadership support terminals communicable with the leadership support terminal. The information analyzer determines presence or absence of a danger of isolation, based on at least the terminal identification information, recorded in either the communication information or the data storage, which is transmitted and received between the leadership support terminals. The information presenter outputs warning information indicative of a danger of isolation according to determination results of the information analyzer. Thus, the leadership support terminal determines the presence or absence of the danger of isolation of the leadership support terminal by the communication information that is transmitted and received between the leadership support terminals. Consequently, the leadership support terminal is able to determine the danger of isolation of a member carrying the leadership support terminal without being influenced by temporary worsening of communication conditions, thereby preventing dangers involved in isolation.

BRIEF DESCRIPTION OF THE DRAWINGS

The objects and features of the present invention will become more apparent from consideration of the following detailed description taken in conjunction with the accompanying drawings in which:

FIG. 2 schematically shows a data structure used in a data storage of the leadership support terminal shown in FIG. 1;

FIG. 5A schematically shows the data structure of a terminal ID transmission request that is handled in the leadership support terminal shown in FIG. 1;

FIG. 5B schematically shows the data structure of a connection possibility confirmation request that is handled in the leadership support terminal shown in FIG. 1;

FIG. 5C schematically shows the data structure of a connection confirmation reply that is handled in the leadership support terminal shown in FIG. 1;

FIG. 5D schematically shows the data structure of a terminal ID reply that is handled in the leadership support terminal shown in FIG. 1;

FIG. 8 is a flowchart useful for understanding an operational procedure for the transmission of an information sending request that is implemented in the leadership support terminal shown in FIG. 1;

FIG. 9A schematically shows the data structure of the information sending request that is handled in the leadership support terminal shown in FIG. 1;

FIG. 9B schematically shows the data structure of an information sending response that is handled in the leadership support terminal shown in FIG. 1;

FIG. 9C schematically shows the data structure of warning data that is handled in the leadership support terminal shown in FIG. 1;

FIG. 17 schematically shows the data structure of warning data that is handled in the leadership support terminal shown in FIG. 15;

DESCRIPTION OF THE PREFERRED EMBODIMENTS

Figure 1:
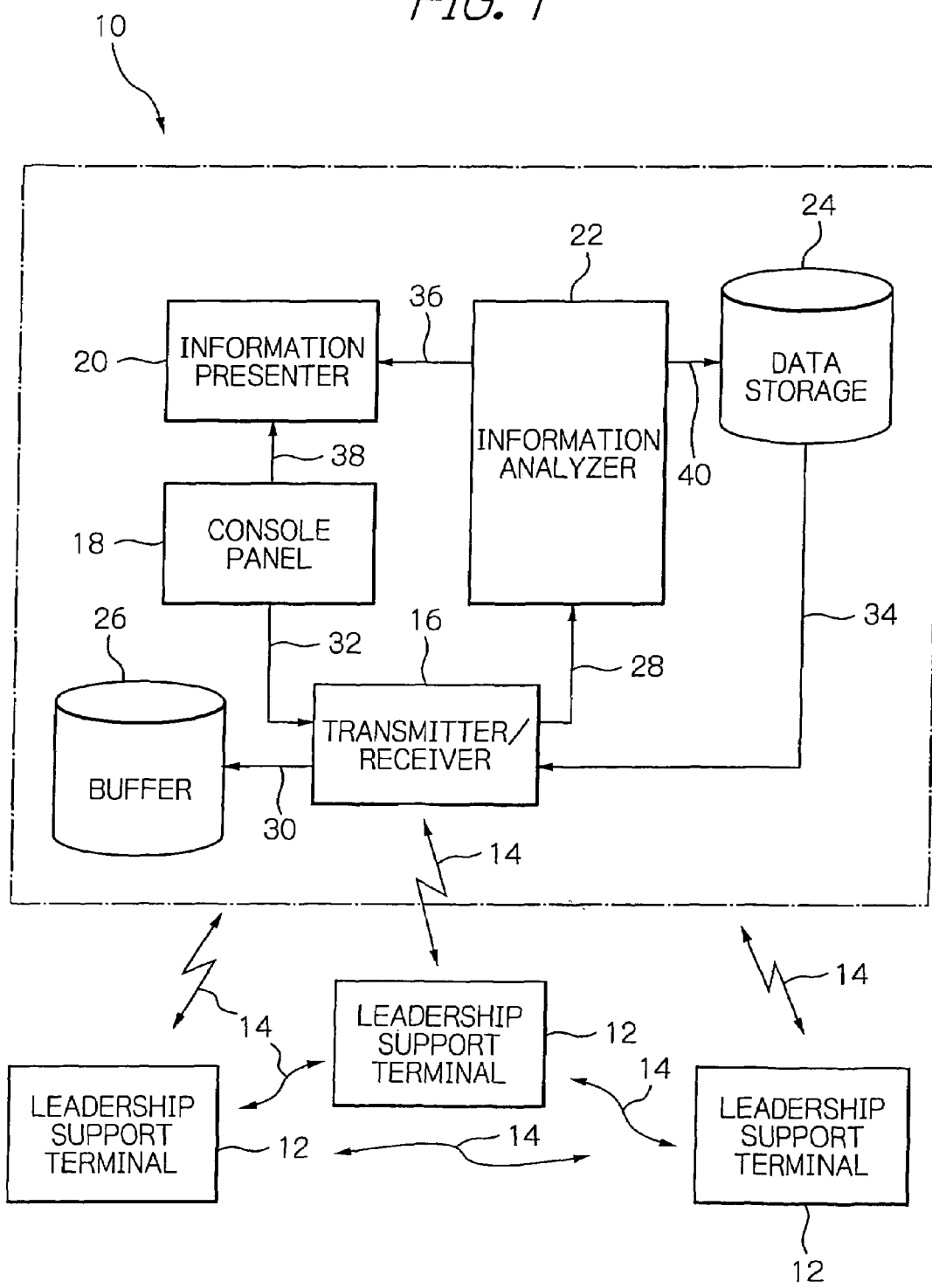
FIG. 1 is a schematic block diagram showing a network to which a leadership support system according to the present invention is applied, and leadership support terminals corresponding to nodes that constitute the network.

Referring initially to FIG. 1, a preferred embodiment of a leadership support system in accordance with the present invention is generally designated by a reference numeral 10, and includes a plurality of leadership support terminals 12, at least one of which is to be carried by a leader or guide, sometimes referred to as a leader terminal and the remaining of which is/are to be carried by a member or members to be led, sometimes referred to be a member terminal. Each of the member terminals is adapted to relay communication information not addressed thereto or receive communication information addressed thereto to send back a response to the corresponding communication information. The leader terminal is adapted to determine how many times the communication information is relayed to determine whether or not the member terminal that transmitted the communication information is in danger of isolation, and when it determines that member terminal is in danger of isolation, it outputs a warning signal indicative of the danger of isolation to that member terminal. Thus, the leadership support system 10 is configured to determine the possibility, i.e. presence or absence, of the danger of isolation of a leadership support terminal on the basis of communication information that is transmitted and received between the leadership support terminals. The system 10 is thus able to determine the danger of isolation of a member carrying the leadership support terminal 12 without being influenced by temporary worsening of communication conditions, thereby preventing dangers involved in isolation.

In the instant embodiment, the leadership support system of the present invention is applied to what is called a leadership supervision system 10. Note that parts or elements which are not directly relevant for understanding the present invention will be neither be described nor shown. It is also noted in the following description that signals are designated by the reference numerals denoting the connections on which they appear.

The leadership supervision system 10, as shown in FIG. 1, constitutes an ad hoc or peer-to-peer network through multiple hops in which the plural leadership support terminals 12 are carried by the individuals or members of a group to communicate with one another on wireless transmission such as a radio wave 14. The individuals in the leadership supervision system 10 include persons (members) belonging to a group such as tourists, and a person (leader) who leads or supervises the group.

The leadership supervision system 10 is adapted to use, when the leader and a member communicate with each other through some of the leadership support terminals 12, the number of those terminals 12 which relay information or a message, i.e. the number of relays or hops, as well as information about a terminal which can communicate directly during a predetermined period of time without passing multiple hops, in order to determine the condition of the network currently formed. Based on this determination, in order to prevent a member from being separated or isolated from the group when the network moves as the group, the leadership supervision system 10 makes it possible to give advice to the member or members, or inform the leader that one of the members stands isolated or is being isolated from the group. In the instant embodiment, while the leadership of the group in a tour will be described in detail, the present invention is not to be interpreted as being limited to this specific case, but is also applicable to the movement of a group in evacuation for purposes other than that, for example.

In the present embodiment, the leadership support terminals 12 may be the same structure as each other. Each of the leadership support terminals 12 forms a network node, and includes, as shown in FIG. 1 with respect to specific one, a transmitter/receiver 16, a console panel 18, an information presenter 20, an information analyzer 22, a data storage 24, and a buffer 26 which are interconnected as illustrated.

The transmitter/receiver 16 has a function of communicating on radio 14 with other leadership support terminals 12 and other kinds of terminals having the same function. The communication system applicable may be an infrared beam transmission system, a Bluetooth (trademark) communication system, or a wireless LAN (Local Area Network) system, and may be switchable from those systems according to transmission/reception, or line or air conditions.

The transmitter/receiver 16 is adapted to receive the wireless or radio signal 14 and pass the received data 28 and 30 to the information analyzer 22 and buffer 26. The transmitter/receiver 16 is also adapted to receive isolation-warning information 32 from the console panel 18 and data 34 from the data storage 24.

The console panel 18 is equipped with control buttons, key switches, and a voice input device to allow a user, i.e. leader or member, to input instructions and information. The console panel 18 is adapted to accept the manipulation of the user in the form of input information 38 through operation as described later, in order to transmit data 32 through the transmitter/receiver 32 or stop presenting isolation-warning information 36 displayed on the information presenter 20. That is, the manipulation of the console panel 18 by the user is reflected on operation of the relevant structural components of the terminal 12.

The information presenter 20 includes at least a speaker, a vibrator, or a liquid crystal display to present information to the user in the form of sound, vibration, or images. The information presenter 20 is adapted to receive an instruction 36 from the information analyzer 22 to present isolation-warning information, which is to be described later, in the form of audible sound, mechanical vibration, or visual images. Upon the manipulation of the console panel 18 by the user, the input information 38 is fed from the console panel 18 to the information presenter 20.

The information analyzer 22 has functions of analyzing data acquired by the transmitter/receiver 16 and inputting changed or updated data to the data storage 24. The information analyzer 22 further has a function of controlling operation of the relevant components of the terminal 12 through operation, as will be described later. Thus, the information analyzer 22 is adapted to analyze the data 28 acquired by the transmitter/receiver 16, output the instruction 36 to the information presenter 20, and feed the changed data 40 to the data storage 24.

The data storage 24 has functions of receiving data from the information analyzer 22 and recording or storing them as data for analyzing conditions of communication and terminals. The data that are stored may include a terminal ID (identification), which identifies a terminal 12, registration time, and latest access time. These data will hereinafter be referred to as terminal data. The data storage 24 is adapted to receive terminal data 40 from the information analyzer 22 and, through operation to be described later, record or register the terminal ID of other terminals 12 with which the terminal 12 on which the storage 24 is included, i.e. own terminal, can directly communicate without intervening other terminals or nodes 12, for the respective terminals 12. In the case of the leadership support terminal 12 that the leader carries, the data storage 24 records the ID data of all of the terminals which are carried by members who are led by the leader.

The format of the data 40 to be stored in the data storage 24 is exemplarily shown in FIG. 2. The data format contains a terminal ID 42, a registration time 44, a latest access time 46, and a port number 48. The terminal ID 42 is employed for retrieving the terminals 12 and is inherent information to identify specific one of the terminals 12. The registration time 44 is information indicating the time when terminal ID 42 was registered in the data storage 24. The latest access time 46 is information indicating the time when the terminal 12 having the data 40 stored communicated last with a specific terminal 12 having that terminal ID 42 of interest. The retained node number 48 represents the number of terminal IDs that are retained by a terminal, i.e. node, with respect to which a response request was received, which will be described later.

Returning to FIG. 1, the buffer 26 has a function of temporarily retaining data that is transmitted and received by the transmitter/receiver 16. For instance, a ring buffer is applicable so as to retain data or delete old data after a predetermined period of time elapsed or when a predetermined number of or more pieces of data have been transmitted.

The information analyzer 22 and data storage 24 can be implemented by hardware such as physical circuit components, or software such as a programme sequence that is runnable on a central processing unit (CPU), microcomputer, or other arithmetic means. In the case of software, they can be implemented by storing a program sequence for accomplishing the function of those components on a hard disk, then reading out the stored program sequence by a central processing unit, microcomputer or other arithmetic means, and executing the processing steps implementing the function of those components in accordance with the instructions in the program.

Figure 3A:
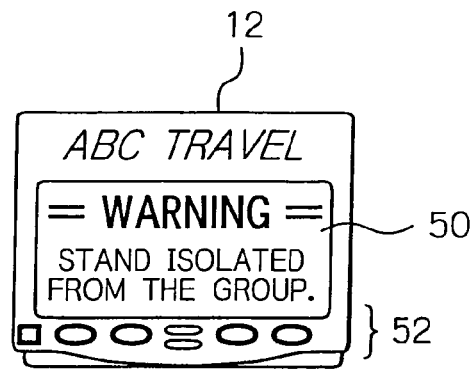
FIG. 3A is a plan view showing an example of the leadership support terminal shown in FIG. 1.
Figure 3B:
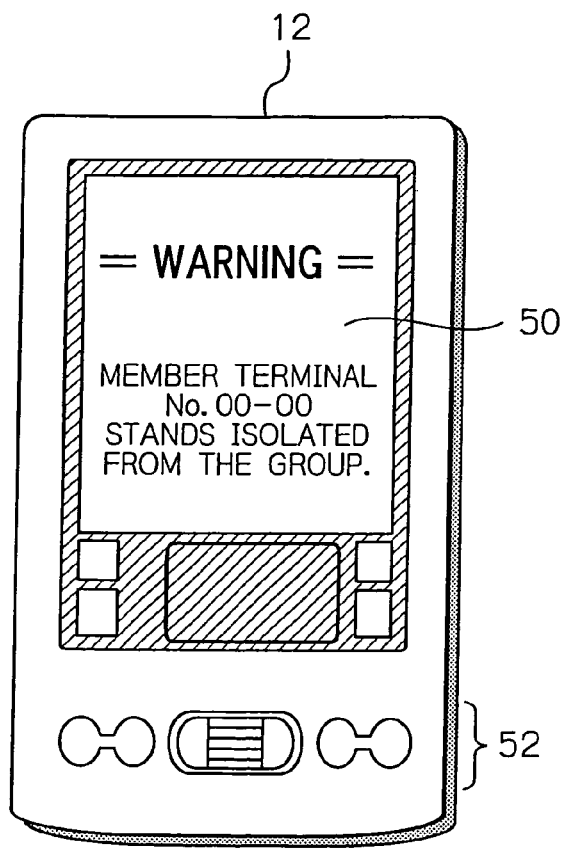
FIG. 3B is a view, similar to FIG. 3A, showing another example of the leadership support terminal shown in FIG. 1.

Two examples of the external appearance of the leadership support terminal 12 are shown in FIGS. 3A and 3B. The leadership support terminal 12, as shown in FIG. 3A, may be in a form suitable for reduction in size, and can be built into a badge or plate representing a group to which tourists belong. Such a form makes it possible for the leader and members to fasten the terminals 12 on their clothes with clips or pins, or to carry them with neck straps.

The leadership support terminal 12, as shown in FIG. 3B, may be in a form suitable for expansion of the operability and information presentability, and can be built into a personal digital assistant (PDA). Such a form also enables the leader and members to expand the operability and information presentability. Note that the leadership support terminal 12 is not to be interpreted as being limited to these specific forms, but may be incorporated into a mobile phone, for example.

The leadership support terminal 12, as shown in FIGS. 3A and 3B, is provided with a liquid crystal display 50, which serves as the information presenter 20, and a console switch panel 52, which serves as the console panel 18. The liquid crystal display 50 displays isolation-warning information such as "=Warning=Stand isolated from the group", or "=Warning=Member terminal No. 00-00 stands isolated from the group", through operation described later. The information presenter 20 may be provided with either a loudspeaker or vibrator to give audible or physical isolation-warning information. The leadership support terminal 12 is able to switch off display or stop vibration and sound by manipulating buttons on the console switch panel 52.

With the constitution described above, the leadership support terminal 12 in the leadership supervision system 10 of the present embodiment searches for and registers other communicable terminals, then transmits and receives data through peer-to-peer communication as needed, and transfers data to other terminals through multiple hops. The leadership support terminal 12 transmits and receives isolation-warning data based on the number of hops during communication, and the terminal that received the warning data issues a warning of the danger of isolation. Procedures therefor are generally classified into four processes: (1) terminal search and registration, (2) transmission/reception and transfer of an information sending request, (3) reception of an information sending response and transmission of warning data, and (4) reception and transfer of warning data.

In the instant embodiment, one of the leadership support terminals 12 which requests the search and registration in other communicable terminals will hereinafter be referred to as a requester terminal, while another of the leadership support terminals 12 which replies to the request from the requester terminal will hereinafter be referred to as a replier terminal.

(1) Terminal Search and Registration

Figure 4:
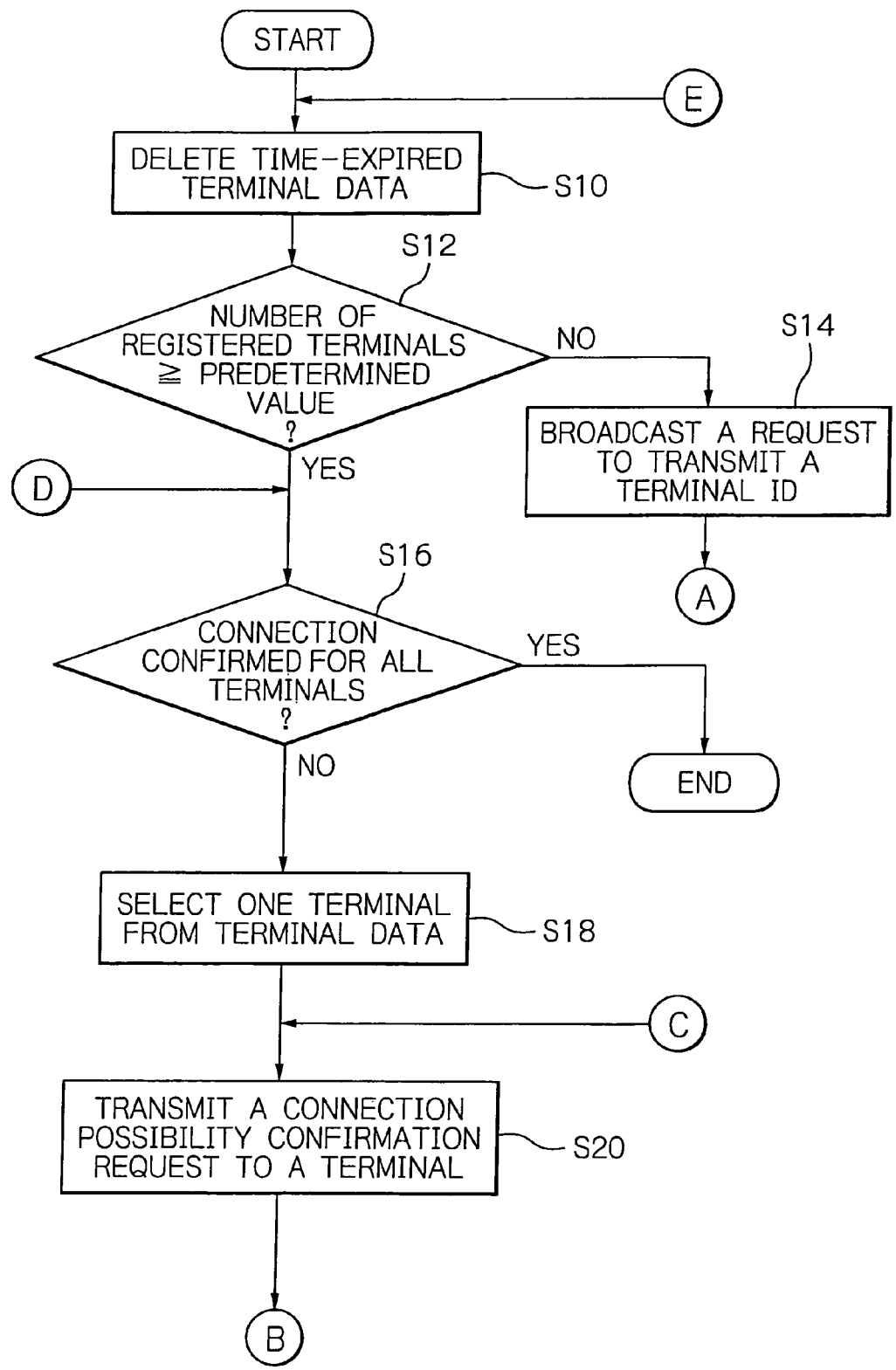
FIG. 4 is a flowchart useful for understanding an operational procedure for a terminal search and registration process that is implemented in the requester leadership support terminal shown in FIG. 1.

With respect to the operation of the leadership supervision system 10, description will be given separately on the operations of the requester terminal and the replier terminal. For the terminal search and registration in the requester terminal 12, as shown in FIG. 4, registration is started in the information analyzer 22 at predetermined intervals and according to an instruction input through the terminal console panel 18. The information analyzer 18 retrieves the latest access time of terminal data stored in the data storage 24, and deletes terminal data having expired (step S10).

The data having expired is either data in which the latest access time has not been updated for a fixed period of time, or data in which the fixed period of time has passed since the latest access time.

The information analyzer 22 then determines whether or not the number of pieces of terminal data stored in the data storage 24 is equal to or greater than a predetermined value (step S12). When the number of pieces of terminal data is less than the predetermined value, the information analyzer 22 advances to a broadcast step S14. On the other hand, when it is equal to or greater than the predetermined value, the information analyzer 22 advances to a confirmation determination step S16.

In the broadcast process, at least a terminal ID transmission request having information such as the one shown in FIG. 5A is broadcast to a transmission destination (step S14). The broadcasting is performed without specifying the terminal ID of the transmission destination. As shown in FIG. 5A, the terminal ID transmission request 54 contains two information fields 56 and 58. The first information field 56 stores a first request type 1 which indicates that data is a terminal ID transmission request for broadcasting, while the second information field 58 stores the terminal ID of a requester terminal 12 which is broadcasting the data. Operation of the replier terminal that received this terminal ID transmission request is to be described later. Thereafter, the processing steps in the replier terminal are executed via a connector A shown in FIG. 4.

In the confirmation determination step S16, the information analyzer 22 determines whether or not connection confirmation has been completed for all leadership support terminals indicated by the terminal IDs stored. When the information analyzer 22 determines that connection confirmation has been completed for all terminal IDs, it advances to the end of registration (END) and concludes the process. When it determines that connection confirmation and update time have not been updated for all terminal IDs, it advances to an ID selection step S18.

In the ID selection step S18, an arbitrary terminal ID is selected by a controller, not shown, from the terminal data stored in the data storage 24.

Next, the transmitter/receiver 16 transmits at least information containing a connection possibility conformation request 60 to the terminal 12 indicated by the selected ID (step S20). The connection possibility conformation request 60, as shown in FIG. 5B, contains three information fields 62, 64, and 66. The first information field 62 stores a second request type 2 which indicates that data is a connection possibility confirmation request, the second information field 64 stores a terminal ID representing a destination to which the data is transmitted, and the third information field 66 stores the terminal ID of the requester terminal 12 which is transmitting the data. After the information transmission, a reception determination step S22 in FIG. 6 is executed via a connector B.

Figure 6:
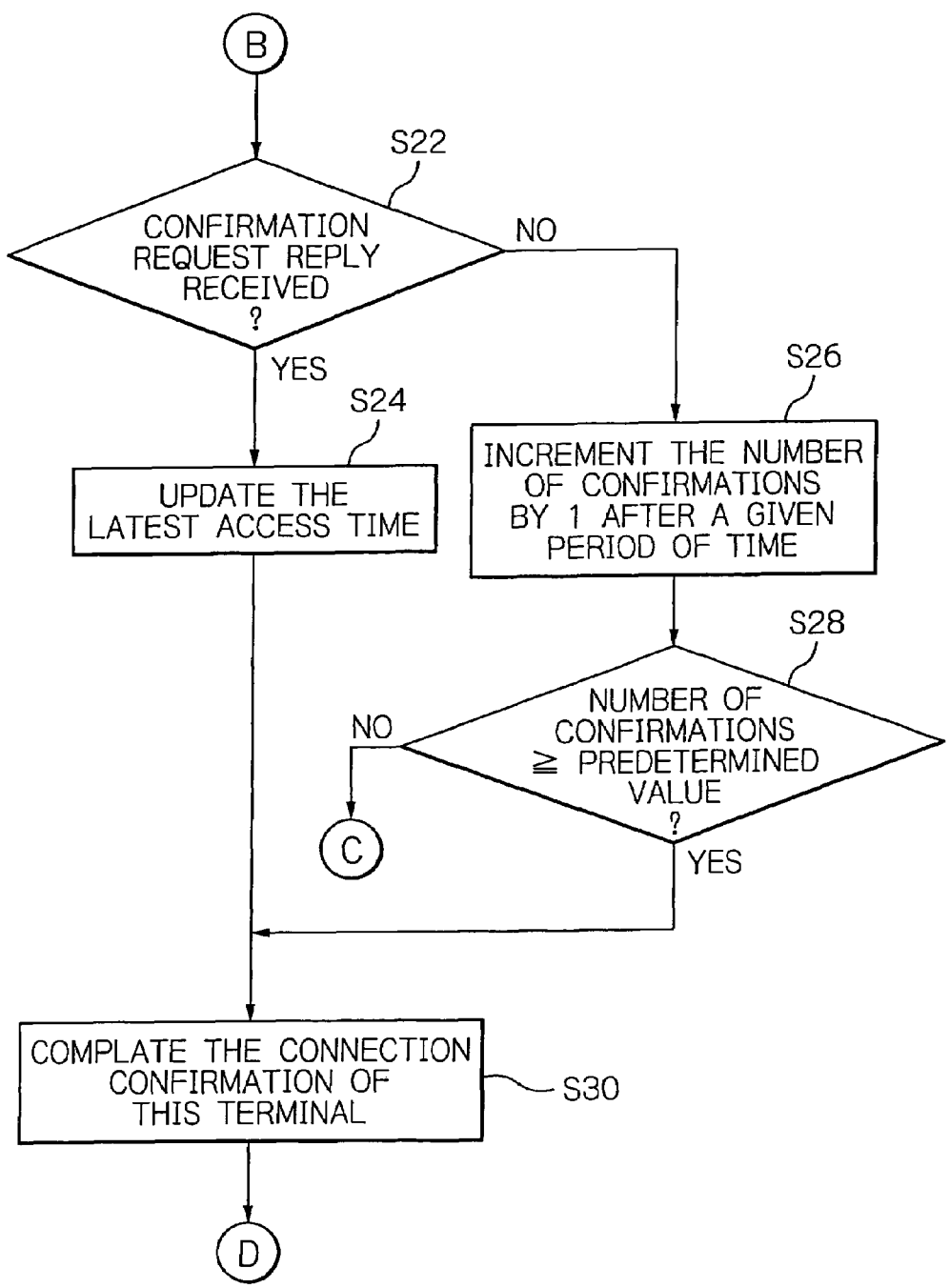
FIG. 6 is a flowchart useful for understanding a procedure which continues to and from the operational procedure of FIG. 4.

In the reception determination step S22, FIG. 6, the information analyzer 22 determines at least the presence or absence of the reception of information containing a connection confirmation reply 68. The connection confirmation reply 68 is a reply to the connection possibility confirmation request 60. When the information analyzer 22 receives the connection confirmation reply 68, it advances to an updating step S24. When it receives no connection possibility confirmation request, it advances to a confirmation number addition step S26.

The connection confirmation reply 68, as shown in FIG. 5C, contains four information fields 70, 72, 74, and 76. The first information field 70 stores a second reply type 2 which indicates that data is a connection confirmation reply. The second information field 72 stores the terminal ID of the requester terminal 12 that transmitted the connection possibility confirmation request 60, i.e. the terminal ID that is requesting a reply. The third information field 74 stores the terminal ID of a replying terminal 12 that sends a reply, and the fourth information field 76 stores the terminal data that the replying terminal 12 has retained in the data storage 24, i.e. the number of terminal IDs.

In the updating process, the information analyzer 22 updates to the present time the latest access time of one (the replying terminal ID) of the terminal data (terminal IDs) in the data storage 24 which is contained in the connection confirmation reply (step S24).

In the confirmation number addition step S26, the information analyzer 22 increments the number of confirmations by 1 after a predetermined period of time. Thereafter, it advances to a confirmation number determination step S28.

In the confirmation number determination step S28, the information analyzer 22 determines whether or not the number of confirmations is less than a predetermined value. When the confirmation number is equal to or greater than the predetermined value, the information analyzer 22 advances to a connection confirmation completion step S30. When the confirmation number is less than the predetermined value, the information analyzer 22 advances to a process of transmitting the confirmation request 60 to the selected terminal 12, via a connector C (step S20).

In the connection confirmation completion step S30, the information analyzer 22 completes the connection confirmation of the terminal 12 indicated by the selected terminal ID, when the updating step S24 has completed or when the number of confirmations is equal to or greater than the predetermined value in step S28. After this completion, the information analyzer 22 returns to the step S16, FIG. 4, of determining connection confirmation for all the terminal IDs, via a connector D. Thus, the processing will be repeated until the connection confirmation in registration is completed (step S16).

Figure 7:
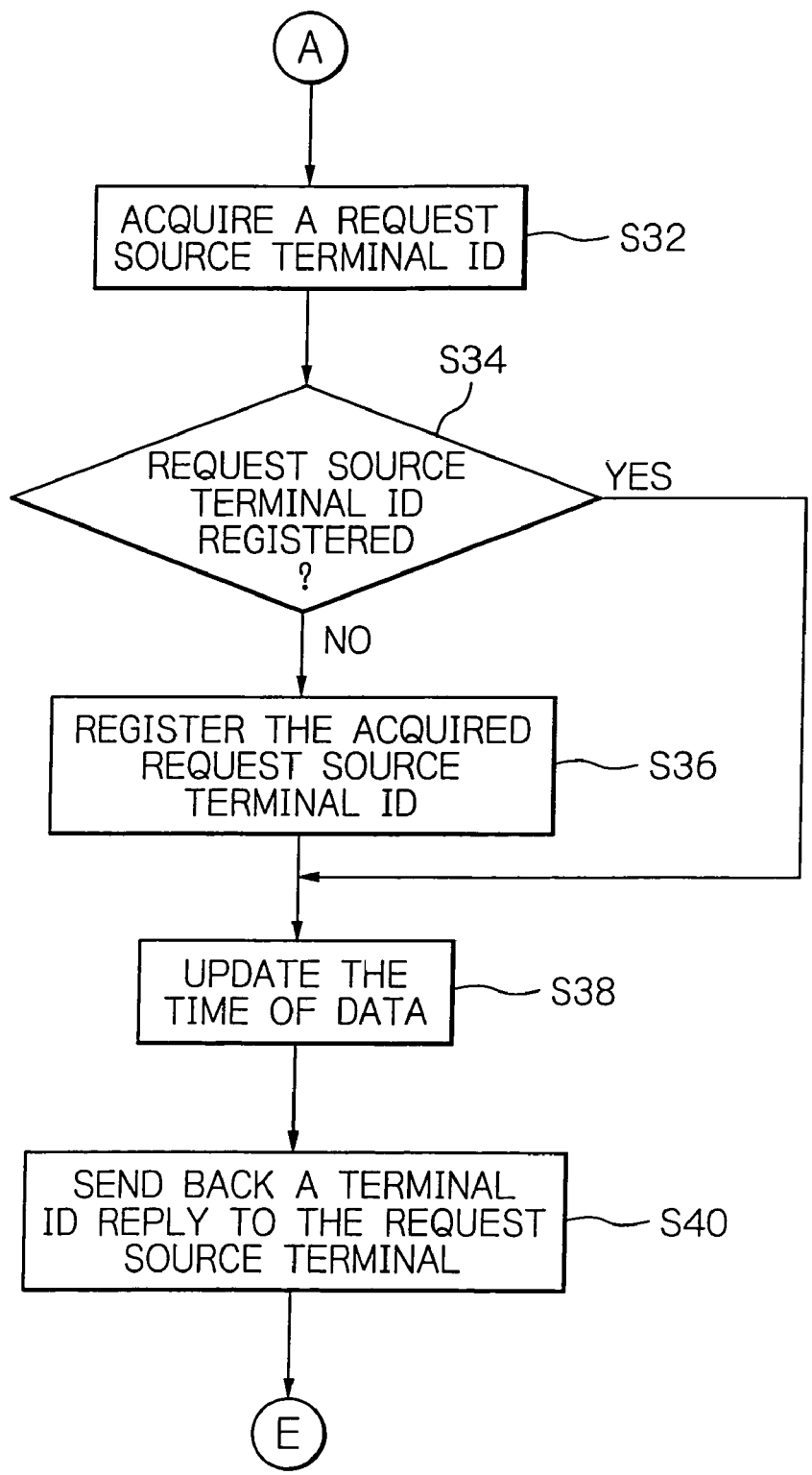
FIG. 7 is a flowchart useful for understanding an operational procedure for a terminal search and registration process that is implemented in the replier leadership support terminal shown in FIG. 1.

After the requester terminal 12 has broadcast the terminal ID transmission request 54, an information acquisition step S32, FIG. 7, which is a terminal search-registration process in a replier terminal 12 that received the request 54 is performed via a connector A.

In the information acquisition step S32, the information of the source terminal ID is acquired from the terminal ID transmission request 54 received in the transmitter/receiver 16 of the replying terminal 12.

Next, the information analyzer 22 retrieves the terminal data stored in the data storage 24 to determine whether or not the acquired source terminal ID 58 has been registered (step S34). When the acquired source terminal ID 58 has not been registered, the information analyzer 22 advances to a registration step S36. When acquired source terminal ID 58 has been registered, it advances to an updating step S38.

In the registration step S36, the acquired source terminal ID 58 is registered as terminal data in the data storage 24.

In the updating step S38, when the source terminal ID 58 has been registered, or after the registration of the source terminal ID 58, the registration time and latest access time of the terminal ID indicated by the source terminal ID 58 are updated to the present time.

The transmitter/receiver 16 in the replier terminal 12 then at least sends back information containing a terminal ID reply 78 (step S40). The terminal ID reply 78, as shown in FIG. 5D, contains four information fields 80, 82, 84, and 86. The first information field 80 stores a first reply type 1 which indicates a reply to the terminal ID transmission request 54. The second information field 82 stores the terminal ID of the source terminal 12 that transmitted the terminal ID transmission request 54, i.e. the source terminal ID. The third information field 84 stores the terminal ID of the replier terminal 12 that transmits data, i.e. the terminal ID of its own. Further, the fourth information field 86 stores the terminal data retained in the data storage of the own terminal 12, i.e. the number of terminal IDs.

After this transmission, the data updating step S10, FIG. 4, will be executed via a connector E. Thus, each leadership support terminal 12 repeats the above-described processing steps at predetermined intervals to thereby complete (1) "Terminal Search and Registration".

The system may be structured such that the terminal search and registration process can also be performed by an instruction given by the user through the console panel 18.

(2) Transmission/Reception and Transfer of an Information Sending Request

In the present embodiment, as set forth above, the leadership support terminal 12 carried by the leader is also called a leader terminal, while the leadership support terminal 12 carried by each member is also called a member terminal.

In the leadership supervision system 10, the leader terminal 12 transmits an information sending request to the member terminal 12 either at predetermined intervals or by manipulating the console panel 18. The member terminal 12 that received this information sending request performs either transfer or reception of this information sending request and sends back an information sending response to the leader terminal 12. This procedure will be described in the sections (2-1) Transmission of the Information Sending Request and (2-2) Reception and Transfer of the Information Sending Request.

The data storage 24 of the leader terminal 12, in addition to all the terminal data registered as described above item (1) Terminal Search and Registration Process, registers in advance all the terminal IDs of the member terminals 12 of a group that is led by the leader. This ID registration may be performed by inputting terminal ID information through the console panel 18 by each member, or by moving all the member terminals 12 within the communication range of the leader terminal 12 and then transmitting terminal ID information from each member terminal 12.

(2-1) Transmission of the Information Sending Request

In the leadership supervision system 10, the leader terminal 12 starts transmission of an information sending request at predetermined intervals or by instructions through the console panel 18, as shown in FIG. 8. In this transmission procedure step S42, the information analyzer 22 in the leader terminal 12 arbitrarily selects one terminal ID from all the terminal IDs registered beforehand in the data storage 24.

The information analyzer 22 then calculates a difference between the latest access time of the selected terminal ID and the present time to determine whether or not the calculated value is less than a threshold value (step S44). When the calculated difference is less than the threshold value, the information analyzer 22 determines that the selected terminal ID was accessed for a predetermined period of time, and returns to step S42 to select another terminal ID. When the calculated difference is equal to or greater than the threshold value, the information analyzer 22 determines that there is no access within the predetermined period of time, and advances to a transmission step S46.

In the transmission step S46, the information analyzer 22 transmits at least information containing an information sending request 88 to a terminal which corresponds to the selected terminal ID. The information sending request 88, as shown in FIG. 9A, contains seven information fields 90, 92, 94, 96, 98, 100, and 102. The first information field 90 stores flag information indicative of an information sending request. The second information field 92 stores an ID indicative of inherent information for identifying this information sending request 88, which is generated, for example, from the values of the time when this transmission data was transmitted, destination terminal ID, and request source ID, and is used to uniquely determine the consecutive flow of transmission data.

The third information field 94 is used to indicate how many times this information sending request to be supervised by the information sending request ID 92 was transferred, and stored information in which 1 is added each time a transfer is performed. The fourth information field 96 stores the terminal ID of a relay terminal which was passed through to reach a destination terminal ID 100. As described later, there are cases where the relay terminal ID contains no terminal ID or two or more terminal IDs. The fifth information field 98 stores the terminal ID of a transfer destination terminal to which this transmission data is transferred. The sixth information field 100 stores the terminal ID of a destination terminal that responds to this information sending request 88 last. The seventh information field 102 stores the terminal ID of the leader terminal 12 that transmits this information sending request 88.

Figure 10:
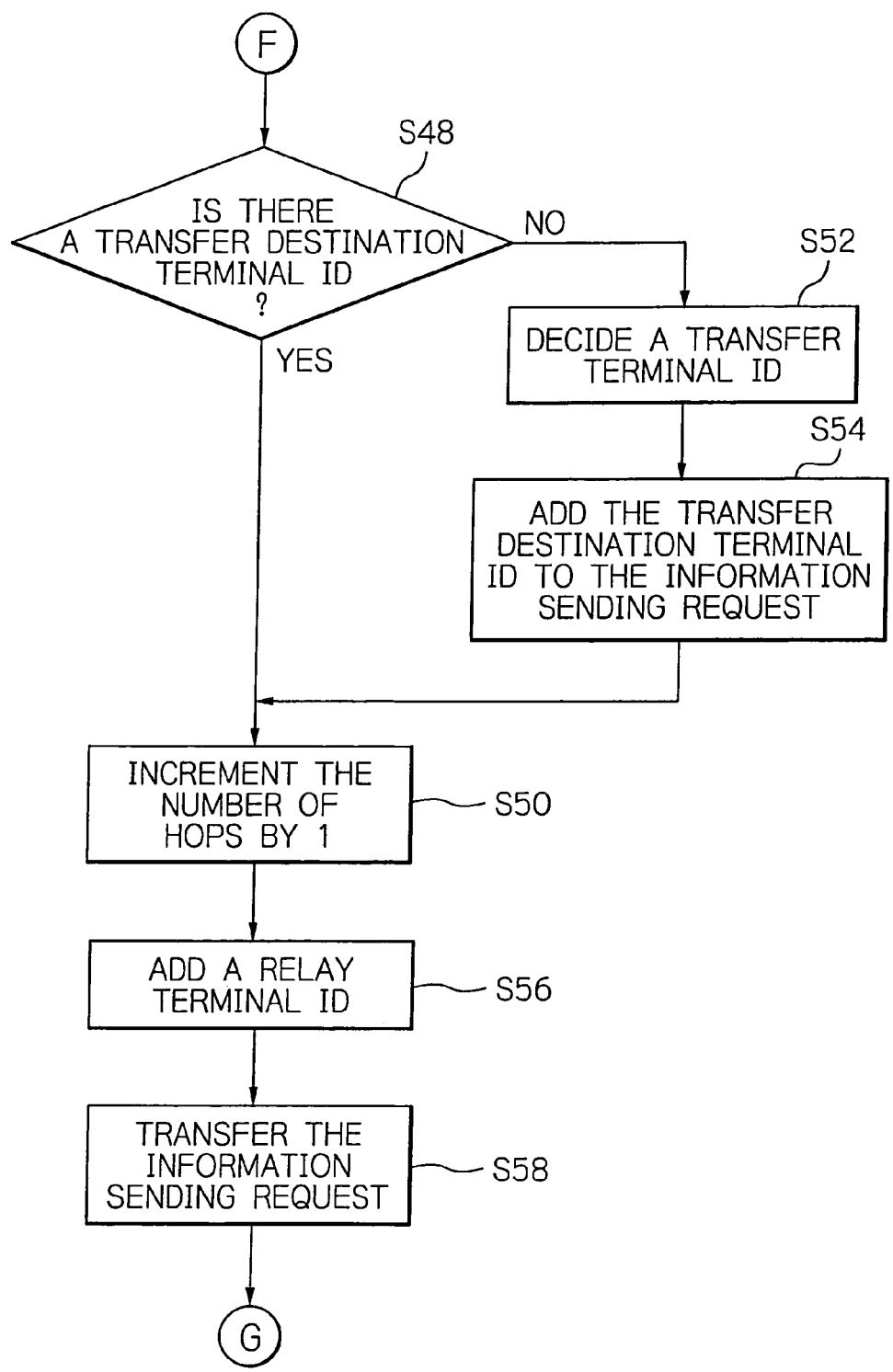
FIG. 10 is a flowchart useful for understanding an operational procedure for the transfer of the information sending request that is implemented in the leadership support terminal shown in FIG. 1.

The leadership supervision system 10 advances to an operational step S48 of the member terminal 12 shown in FIG. 10 via a connector F.

(2-2) Transfer, Reception, and Response of the Information Sending Request

Next, in the leader supervision system 10, the transmitter/receiver 16 of the member terminal 12 receives the information sending request 88 transmitted from the leader terminal 12 described above, and the information analyzer 22 determines whether or not the destination terminal ID 100 in this information sending request 88 matches with the terminal ID of the terminal of its own. When they do not match with each other, the information sending request 88 is transferred. When they match with each other, the information analyzer 22 receives the information sending request 88 to respond to it. A description of these procedures will be given in the subsections (i) Transfer Operation and (ii) Reception and Response Operations.

(i) Transfer Operation

After the transmitter/receiver 16 of the member terminal 12 has received the information sending request 88 transmitted from the leader terminal 12 described above, as shown in FIG. 10, the information analyzer 22 acquires the destination terminal ID 100 from the received information sending request 88, and confirms whether or not the terminal data of the acquired destination terminal ID 100 has been registered in the data storage 24 (step S48). When it has been registered, the information analyzer 22 advances to a hop number addition step S50. When it has not been registered, the information analyzer 22 advances to an ID decision step S52.

In the ID decision step S52, an arbitrary terminal ID is selected as a transfer destination terminal from the terminal IDs registered in the data storage 24, and the selected terminal ID is decided as a transfer destination terminal 12. Methods of selection are exemplified as a method of selecting a terminal ID whose registration time is new, a method of selecting a terminal ID whose number of nodes is greatest, and so on. According to these rules, the transfer destination terminal 12 is decided.

The information analyzer 22 adds the terminal ID of the decided transfer destination terminal 12 as the information of the transfer destination ID of the received information sending request 88 (step S54). The information analyzer 22 then advances to the hop number addition step S50.

In the hop number addition step S50, information in which the hop number in the information sending request 88 has been increased by 1 is used as the latest hop number in the information sending request 88 that is transferred.

Next, the information analyzer 22 adds the terminal ID of the own terminal 12 to the information of the relay terminal ID 96 in the received information sending request 88 (step S56). In the case where two or more transfer destination terminal IDs are selected, steps S50 and S56 and step S58, which will be described later, are repeated.

Next, the transmitter/receiver 16 transfers the information sending request 88 with either the destination terminal ID 100 or transfer destination terminal ID 98 in the information sending request 88 as a destination of transmission (step S58). After this transfer, the leadership supervision system 10 advances to an operation step S60, FIG. 11, of the member terminal 12 shown in FIG. 11 via a connector G.

(ii) Reception and Response Operations

Through the connector G, at the step S60, the transmitter/receiver 16 of the member terminal 12 receives either the information sending request 88 transmitted from the leader terminal 12 (step S46) or the information sending request 88 transmitted from the member terminal 12.

The transmitter/receiver 16, among the transmission data retained in the buffer 26, retrieves the information sending request ID 98 in the information sending response 104, FIG. 9B, which matches with the information sending request ID in the received information sending request 88 (step S62).

Based on the retrieval results, it is determined whether or not an information sending response to the received information sending request 88 has been transmitted (step S64). When the same information sending request ID as the information sending request ID in the received information sending request 88 is present in the buffer 26, it is determined that a response to this information sending request has been transmitted, and a discard step S66 will be carried out. When it is determined that the information sending response has not been transmitted, a response transmission step S68 will be carried out.

In the discard step S66, the received information sending request is discarded. In the response transmission step S68, information is acquired from the received information sending request to generate at least an information sending response 104, and the response 104 is transmitted with the leader terminal 12 as a destination terminal.

The information sending response 104 contains eight information fields 90, 92, 94, 106, 96, 98, 100, and 108. The information fields 90, 92, 96, 98, and 100 correspond to the above-described information sending response flag, information sending request ID, hop number, relay terminal ID, transfer destination terminal ID, and destination terminal ID, respectively. The fourth information field 106 is information acquired from the hop number in the information sending request, and stores information indicative of a hop number during communication in the received information sending request. The eight information field 108 stores the terminal ID of a terminal that transmits this information sending response 104.

Figure 12:
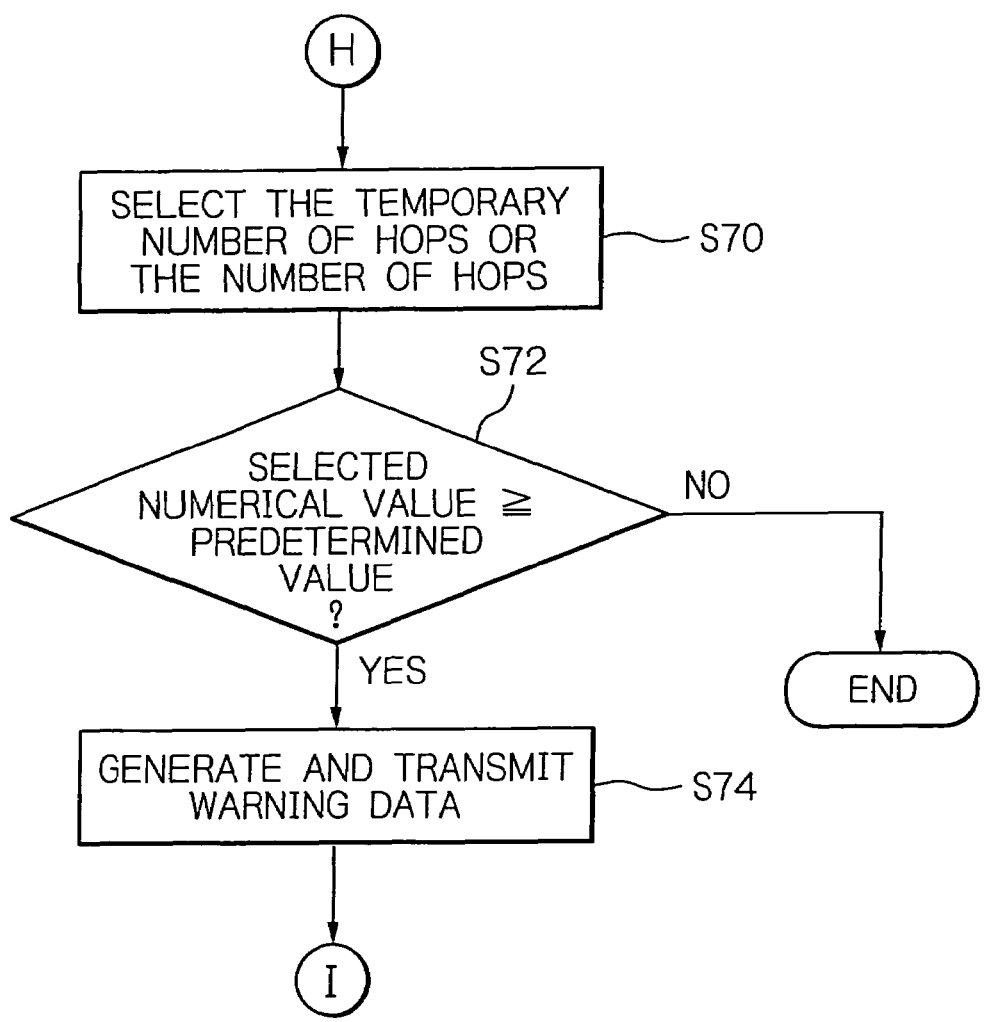
FIG. 12 is a flowchart useful for understanding an operational procedure for the reception of the information sending response and transmission of the warning data that is implemented in the leadership support terminal shown in FIG. 1.

After the above-described discard step S66, FIG. 12, and transmission step S68, the member terminal 12 advances to the step S70 of reception of the information sending response and transmission of warning data of FIG. 12 via a connector H.

Figure 11:
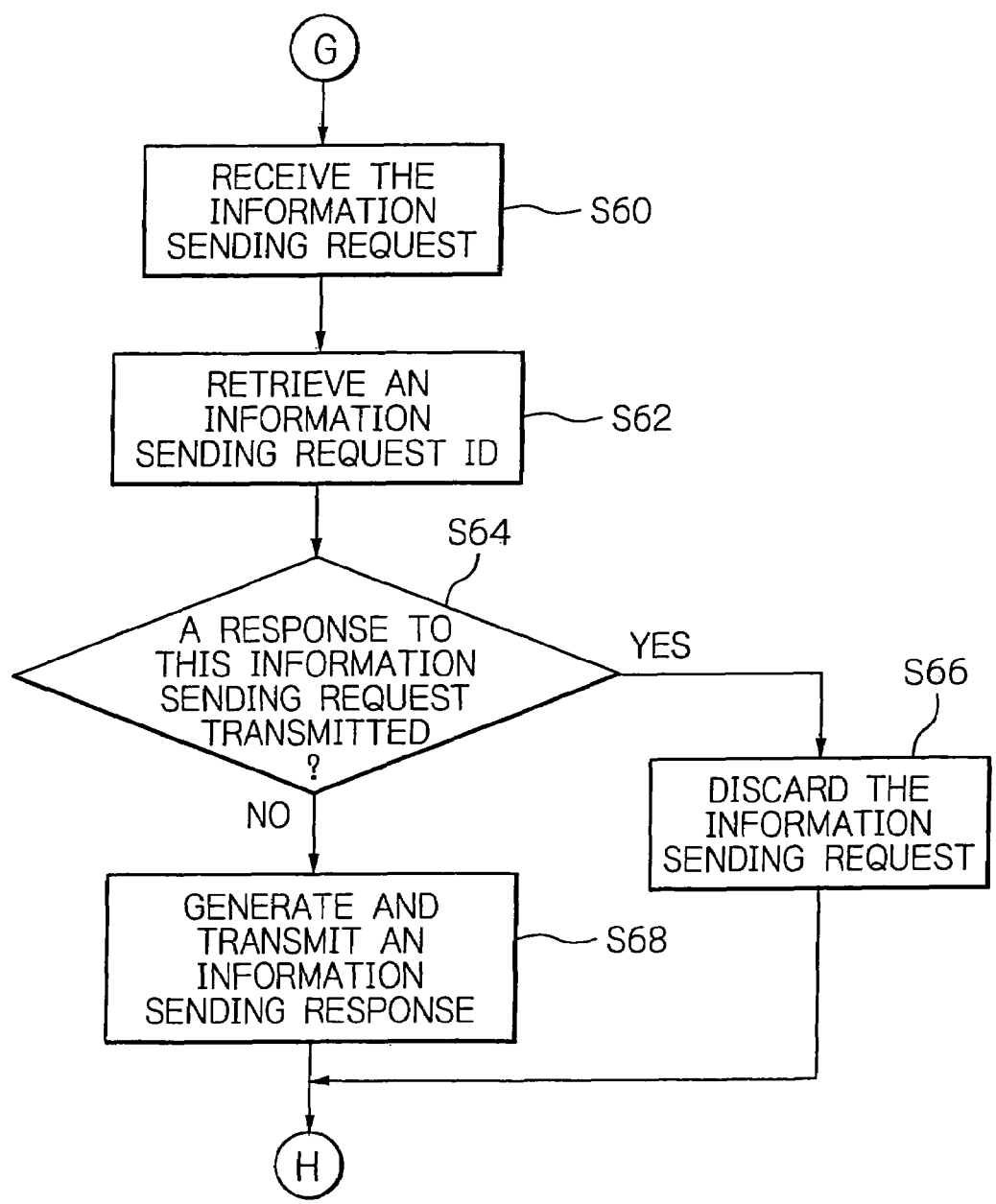
FIG. 11 is a flowchart useful for understanding an operational procedure for the reception and response of the information sending request that is implemented in the leadership support terminal shown in FIG. 1.

(3) Reception of the Information Sending Response and Transmission of Warning Data The transmitter/receiver 16 in either the member terminal 12 or the leader terminal 12 receives the information sending response 104 transmitted from the member terminal 12 shown in FIG. 11, and the information analyzer 22 determines whether or not the destination terminal ID 100 in that information sending response 104 matches with the terminal ID of the own terminal 12. When they do not match with each other, the same processing steps as the steps S48 through S58 of transmitting the information sending request 88 described above will be carried out to transfer this information sending response 104. When they match with each other, the member terminal 12 receives this information sending response 104 or transmits warning data.

The leader terminal 12 advances itself to the step S70 through the connector H shown in FIG. 12, the transmitter/receiver 16 receives the information sending response 104 transmitted from the member terminal 12, and the information analyzer 22 selects a hop number, which is used to determine a danger of isolation described later, from either the hop number in the received information sending response 104 or a temporary hop number.

In the method of selection in the present embodiment, the greater of the above-described two hop numbers is used for determination. However, the present invention is not to be interpreted as being limited to the selection method. For instance, the smaller of the two hop numbers, or either a total value or average value of the two hop numbers, may be used to determine a danger of isolation.

Next, the information analyzer 22 determines whether or not the selected hop number is less than the predetermined value (step S72). When it is equal to or greater than the predetermined value, the information analyzer 22 determines that the mobile terminal 12 which transmitted the information sending response 104 is in danger of isolation, and advances to the warning transmission step S74. When it is less than the predetermined value, the information analyzer 22 goes to the end of the reception operation (END), thus completing the operation.

In the warning transmission step S74, the information analyzer 22 acquires information from the received information sending response 104 to generate al least warning data 110 shown in FIG. 9C, and transmits the warning data with this mobile terminal 12 as a destination terminal.

The warning data 110, as shown in FIG. 9C, contains six information fields 112, 114, 86, 98, 100, and 108. The first information field 112 stores a warning flag indicating that this transmission data is warning data. The second information field 114 stores a warning ID for identifying the warning data 110. The warning ID is generated from the values of the time when the transmission data was transmitted, destination terminal ID, and request source terminal ID, and is used to uniquely determine the consecutive flow of warning data. Further, the information fields 86, 98, 100, and 108 correspond to the above-described relay terminal ID, transfer destination terminal ID, destination terminal ID, and request source terminal ID, respectively.

Figure 13:
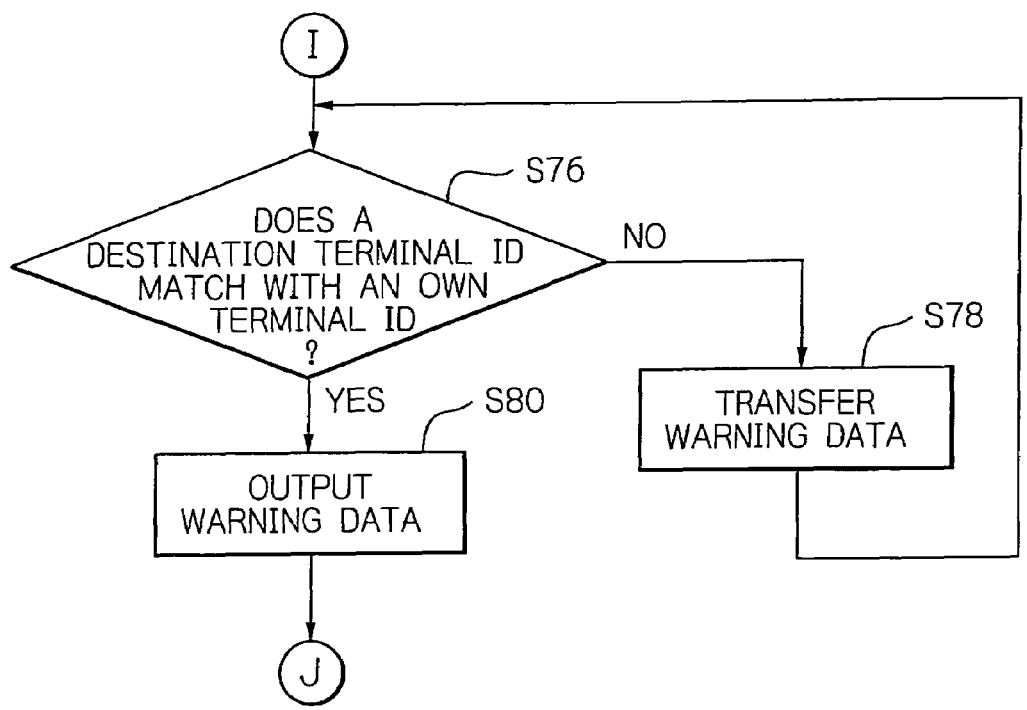
FIG. 13 is a flowchart useful for understanding an operational procedure for the notification of the warning data that is implemented in the leadership support terminal shown in FIG. 1.

The member terminal 12 advances to the step S76, FIG. 13, of reception and transfer of warning data via a connector I.

(4) Reception and Transfer of Warning Data

Through the connector I of FIG. 13, the transmitter/receiver 16 of the member terminal 12 transfers its control to the step S76 in which it receives the warning data 110 transmitted from the leader terminal 12, and the information analyzer 22 determines whether or not the destination terminal ID in the warning data 110 matches with the terminal ID of its own. When they do not match with each other, a transfer step S78 will be carried out. On the other hand, when they match with each other, an informing step S80 will be carried out.

In the transfer step S78, the warning data 110 is transferred in the same manner as the steps S48 to S58 of transferring the information sending request 88. After this transfer, a determination step S76 is carried out.

In the informing step S80, the information analyzer 22 informs the information presenter 20 about the isolation-warning information that the member terminal 12 stands isolated from the group. In the present embodiment, the isolation-warning information is displayed as "Warning: Stand isolated from the group", on the liquid crystal display in the information presenter 20. In the case of employing a loudspeaker in the information presenter 20, the member terminal 12 is informed about the displayed contents of the isolation-warning information by a voice warning signal or audible alarm signal. Furthermore, in the case of employing a vibrator in the information presenter 20, the member carrying the member terminal 12 is informed of the isolation-warning information by the vibrator enabled so that he or she is not isolated from the group.

When the leader terminal 12 transmits the warning data 110, the information analyzer 22 of the leader terminal 12 may inform the information presenter 20 of the effect that the member terminal 12 to which the warning data 110 is transmitted stands isolated from the group. For example, the words "The member terminal No. 00-00 stands separated from the group" may be displayed on the liquid crystal display. Thereafter, the present embodiment shifts to the processing step S42 shown in FIG. 8 via a connector J.

Thus, the present embodiment determines a danger of isolation according to the number of relaying hops during communication and issues a warning. It is thereby able to issue a warning correctly without being influenced by temporary worsening of communication conditions such as the interception of radio waves within a room. In addition, the present embodiment is able to issue a warning of a danger of isolation to both the leader and member terminals 12, so that it can give advice to the member so as not to be isolated, and inform the leader that the member stands isolated or is being isolated from the group. Consequently, the supervision of leadership is facilitated.

Now, a description will be given of an alternative embodiment of the leadership supervision system to which the leadership support system of the present invention is applied. The leadership supervision system 10 in the preceding embodiment determines a danger of isolation by the number of hops in the communication between the leader and member terminals 12, and transmits the warning data 110 from the leader terminal 12 to the member terminal 12. However, since only the leader terminal 12 determines a danger of isolation, there could be a case where the member terminal 12 stands isolated before receiving the warning data 110 from the leader terminal 12 or cannot receive that warning. Therefore, in addition to the determination by the number of hops made in the preceding embodiment, the alternative embodiment takes advantage of the constitution of an ad hoc network, so that a warning can be issued by employing the information of the member terminal 12 without using the leader terminal 12.

The leadership support terminal 12 in the alternative embodiment is basically the same as the preceding embodiment in construction except for the information analyzer 22 in the present embodiment further including a monitor 22a, which is used to observe the information stored in the data storage 24 during information communication. Therefore, when the number of connectable terminals in the data storage 24 is equal to or less than a predetermined value, the transmitter/receiver 16 is caused to transmit warning response data, and the information presenter 20 is caused to present warning information 110.

The detection of a danger in each member terminal 12 will be described with reference to FIG. 15. As with the preceding embodiment, each member terminal 12 performs the steps S10 to S30 of terminal search and registration at predetermined intervals or in response to an instruction given through the console panel 18, whereby other communicable terminals are searched for and registered (step S82).

The information analyzer 22 of each mobile terminal 12 constantly determines whether or not the number of pieces of terminal data registered in the data storage 24 is less than a threshold value, at predetermined intervals or in response to an instruction given through the console panel 18 (step S84). When the number of pieces of terminal data is less than the threshold value, the information analyzer 22 determines that the mobile terminal 12 is in a high danger of isolation, and goes to a warning generation step S86, FIG. 16, via a connector K. When the number of pieces of terminal data is equal to or greater than the threshold value, the information analyzer 22 determines that the member terminal 12 is in slight danger of isolation, and advances to a stand-by step S88.

In the stand-by step S88, the operation of the information analyzer 22 is stopped for a given period of time. Thereafter, the information analyzer 22 again returns to the search and registration step S82 and repeats the above-described processing.

Figure 16:
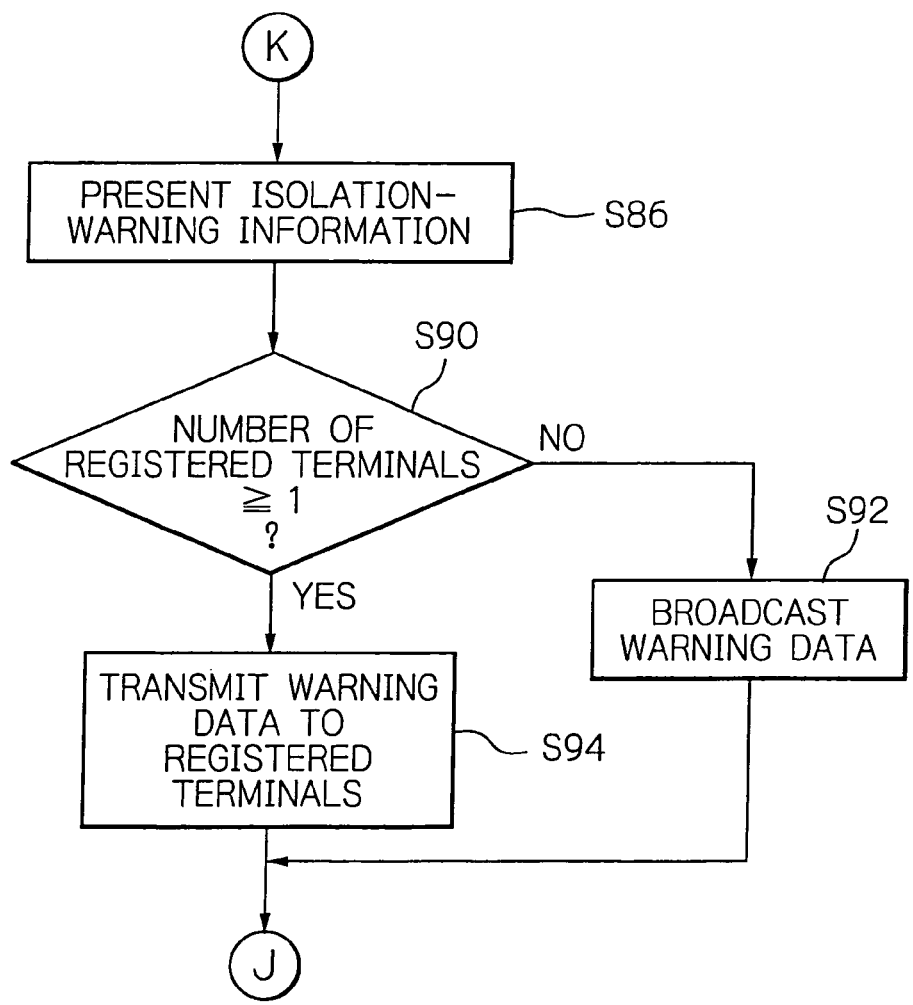

When the member terminal 12 is determined to be in high danger of isolation (step S84), the warning generation process shown in FIG. 16 is carried out through the connector K. The information analyzer 22 informs the information presenter 20 about isolation-warning information 116 that this member terminal 12 is in a state of isolation (step S86). This isolation-warning information 116, as with the preceding embodiment, is used to issue a warning signal so as not to be isolated from a group, for example, by displaying "Warning: Stand separated from the group" when a liquid crystal display is employed as the information presenter 20.

Next, the information analyzer 22 determines whether or not the number of pieces of terminal data registered in the data storage 24 is less than the unity (step S90). When it is less than the unity, the information analyzer 22 advances to a broadcast step S92. When it is not less than the unity, the information analyzer 22 advances to a transmission step S94.

In the broadcast step S92, when the number of pieces of terminal data is equal to zero, at least warning data 116 indicative of a warning of isolation shown in FIG. 17 is broadcast.

In the transmission step S94, the warning data 116 shown in FIG. 17 is transmitted to all the terminals corresponding to the registered terminal data. After the broadcasting or transmission, the procedure is repeated.

The warning data 116, as shown in FIG. 17, contains a warning flag 112, a warning ID 114, a destination terminal ID 100, and a request source terminal ID 108. In the case of broadcasting, no destination terminal ID is specified.

The member terminal 12 and leader terminal 12 that received this warning data perform processing in the same procedure as the procedure described in the section (4) Reception and Transfer of Warning Data set forth in respect of the preceding embodiment.

Thus, the present alternative embodiment is able to issue a warning indicative of a danger of isolation without causing the member terminal 12 to communicate with the leader terminal 12. This alternative embodiment also sends out a warning to the surrounding communicable member terminals 12, so that it can inform the surrounding terminals 12 about a danger of isolation and let them known a member terminal that is in danger of isolation. Consequently, the alternative embodiment is able to effectively prevent members from being isolated from the group. Further, this embodiment can considerably reduce the amount of communication data compared with the case where the leader terminal 12 communicates with the member terminal 12.

The two preceding embodiments are adapted to issue a warning signal according to either the number of hops in the communication between the leader terminal 12 and the member terminal 12 or the number of communicable member terminals 12. Therefore, even in the event that a group extends into a longer array when the members are walking on a thin alley during sight-seeing, a warning will be sent out. However, in such a situation, the tour members are in slight danger of isolation. Thus, in the two preceding embodiments, if the distance from the leader terminal 12 to a member terminal 12 is merely long, a warning will be given to that member terminal 12.

Figure 18A:
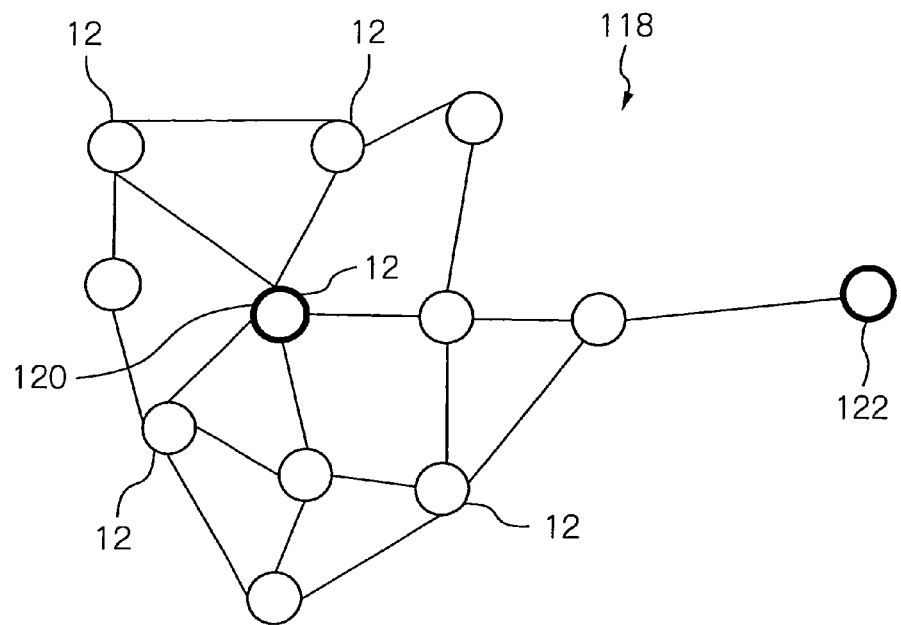
FIGS. 18A and 18B schematically show exemplified networks constituted by the leadership support terminals of the leadership support system of the present invention.
Figure 18B:
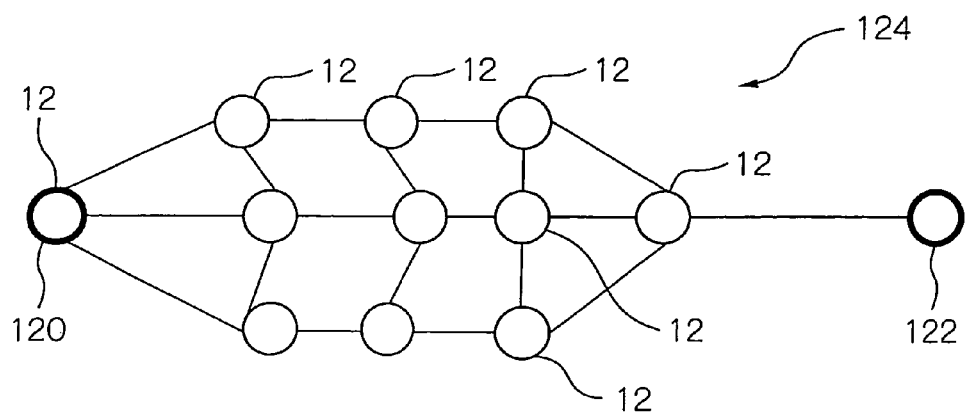

Hence, a description will be given of another alternative embodiment that is able to cope effectively with such a situation. In the present alternative embodiment, consider networks that are formed by two or more leadership support terminals 12, as shown in FIGS. 18A and 18B. In the figures, two leadership support terminals 12 linked by a straight line can communicate with each other directly. In the network 118 shown in FIG. 18A, member terminals 12 are moved in a group with a leader terminal 120 situated at the center of the group, and a member terminal 122 is in danger of isolation. In such a case, a warning may be sent to the member terminal 122 in which the number of hops in the communication between itself and the leader terminal 120 becomes three or more during movement.

In the network 124 shown in FIG. 18B, a leader terminal 120 leads a group in which member terminals 12 are disposed in rows, and a member terminal 122 is in danger of isolation. In the network 124 where the number of hops in the communication between the leader terminal 120 and the member terminal 120 will increase inevitably, if a warning is issued to a member terminal 122 in which the number of hops is three or more, a warning will be transmitted to a member who is in slight danger of isolation. In such a case, members cannot reply upon the system operation any longer.

Therefore, in the present alternative embodiment, the leader grasps the present situation of the group, then the leader terminal sends out a mode switching instruction to each terminal within the network to select a method of detecting a danger of isolation, and according to situations such as when the group extends long or when the leader does not move but members move around, both the leader terminal 12 and the member terminal 12 are able to detect a danger of isolation.

Figure 19:
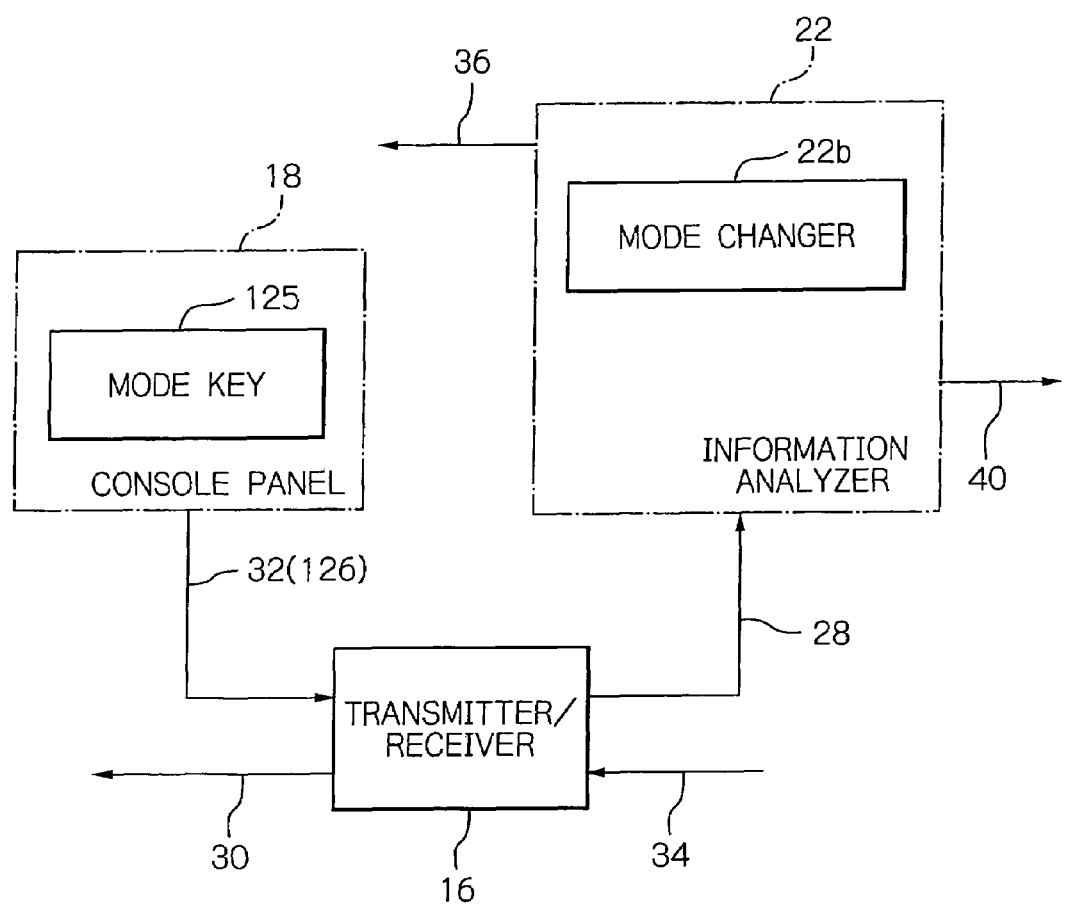
FIG. 19 is a schematic block diagram showing integral parts of another alternative embodiment of the leadership support terminal used in the leadership support system of the present invention.

The leader support terminal 12 according to the present embodiment is basically constituted by the components described above. Integral parts of the leadership support terminal 12 are shown in FIG. 19. The console panel 18 in the present embodiment, as shown in FIG. 19, has an additional function of sending a mode switching request 126 to the transmitter/receiver 16 as an instruction signal 32 in response to an instruction given through a mode specifying key 125 by the user such as a leader. The transmitter/receiver 16 transmits this instruction signal 32. The information analyzer 22 in the present embodiment further includes a mode changer 22b that is able to switch between methods of detecting a danger of isolation by receiving and analyzing the mode switching request 126.

Figure 20:
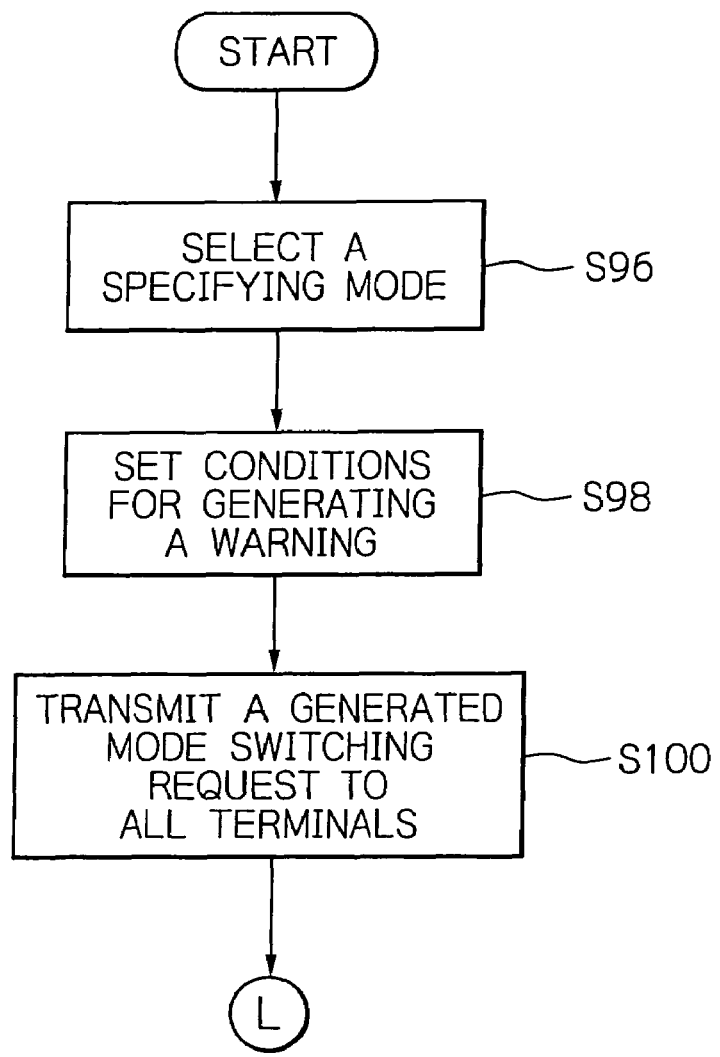
FIG. 20 is a flowchart useful for understanding an operational procedure for the transmission of a mode switching request that is implemented in the leadership support terminal shown in FIG. 19.

The transmission of the mode switching request in the leader terminal 12 will be described with reference to FIG. 20. The leader manipulates the console panel 18 of the leader terminal 12 to manipulate mode switching, and then specifies a method of detecting a danger of isolation (step S96). The leader may specify either one of the methods of taking advantage of the number of hops described in respect of the first embodiment, i.e. a hop number mode, and of taking advantage of the number of pieces of terminal data in the data storage 24 described in respect of the second embodiment, i.e. a terminal number mode.

Next, values for deciding conditions for generating a warning in these methods are set (step S98). In the method utilizing the number of hops, the number of hops for generating a warning is set as a threshold. In the method utilizing the number of pieces of terminal data, the number of terminals for generating a warning is set as a threshold.

Next, the information analyzer 22 in the leader terminal 12 (120) acquires information that was input through the console panel 18, generates at least the mode switching request 126, and transmits it to all the mobile terminals 12 of this group (step S100). After these settings, a reception process shown in FIG. 21 will be carried out from the step S102.

Figure 22:
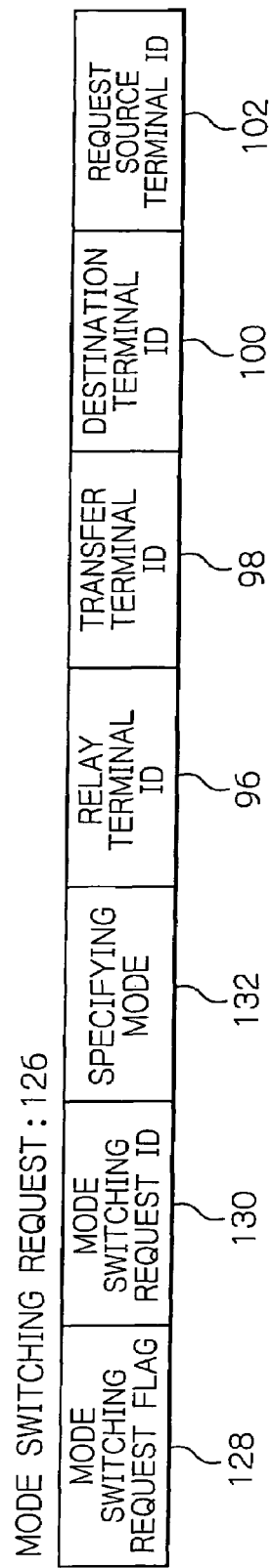
FIG. 22 schematically shows the data structure of the mode switching request that is handled in the leadership support terminal shown in FIG. 19.

The mode switching request 126, as shown in FIG. 22, contains seven information fields 128, 130, 132, 96, 98, 100, and 102. The first information field 128 stores a request flag that is information indicating that this transmission data is a mode switching request. The second information field 130 stores a mode switching request ID that is inherent information for identifying this mode switching request. The mode switching request ID is generated, for example, from the values of the time when this transmission data was transmitted, a destination terminal ID, and a request source terminal ID, and is used to uniquely determine the consecutive flow of transmission data. The third information field 132 stores a specifying mode that is information for specifying a method of detecting a danger of isolation.

Figure 21:
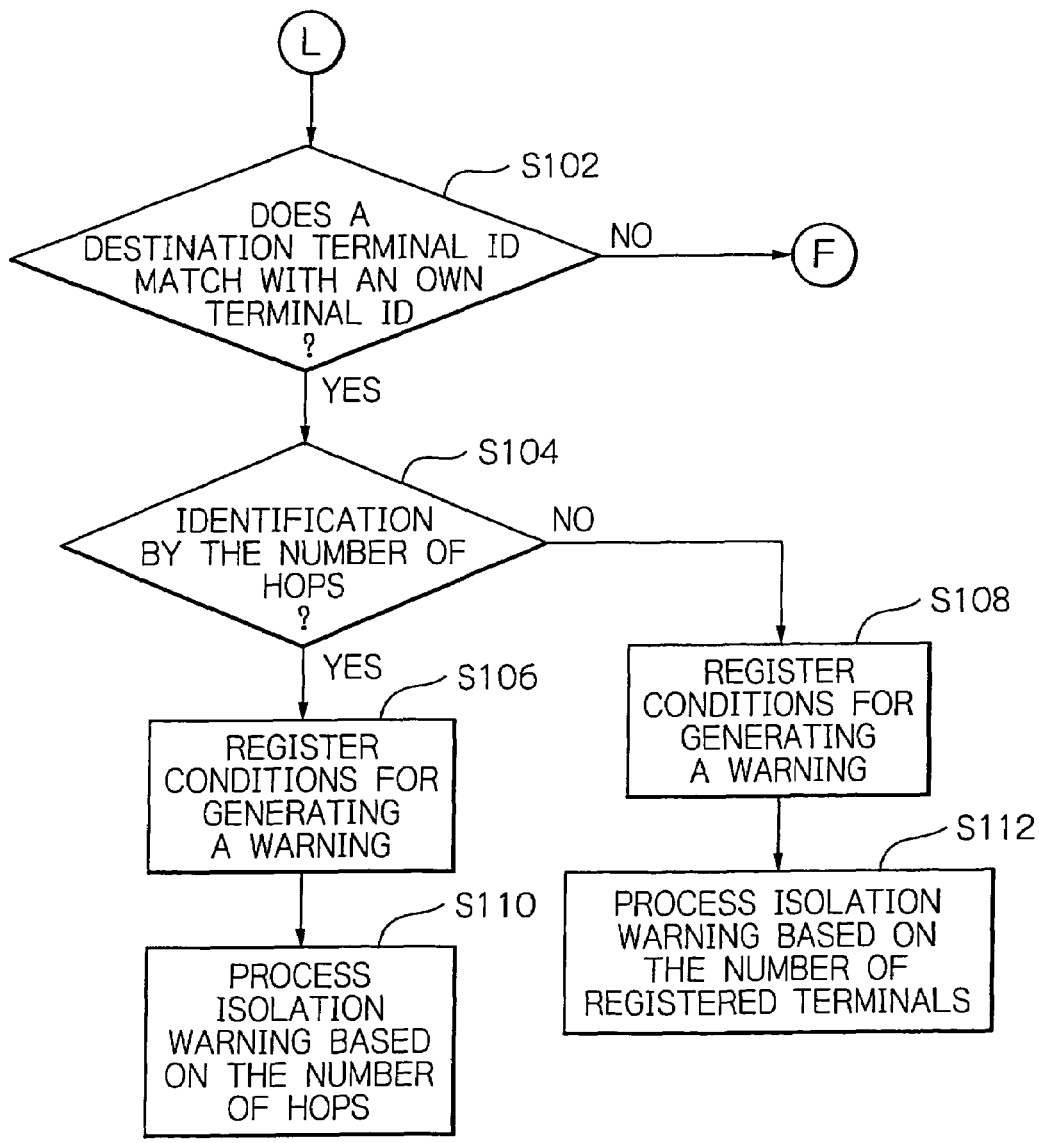
FIG. 21 is a flowchart useful for understanding an operational procedure for the reception of the mode switching request according to the leadership support terminal shown in FIG. 19.

Next, the reception operation in the member terminal 12 that received the mode switching request 126 will be described with reference to FIG. 21. The transmitter/receiver 16 of the member terminal 12 receives the mode switching request 126 transmitted from the leader terminal 12 (120) described above, and the information analyzer 22 determines whether or not the destination terminal ID in the mode switching request 126 matches with the own terminal ID (step S102). When they do not match with each other, the information analyzer 22 advances to the transfer step S48 via the connector F. When they match with each other, the information analyzer 22 advances to a determination step S104 for the mode switching request 126.

In the transfer process, the mode switching request 126 is transferred by executing the same processing steps as the transfer procedure for the information sending request 88. This is depicted in FIG. 21 with the connector F to transfer the control to the steps S48 to S58, FIG. 10. A description of the procedure will not be given for avoiding redundancy.

In the determination step S104 for the received mode switching request 126, the information analyzer 22 receives the mode switching request 126 and determines whether or not the specifying mode is a mode for identifying by the number of hops. In the case of identifying by the number of hops, a first registration process will be carried out (step S106). In the case of identifying by the number of pieces of terminal data registered in the data storage, a second registration process will be carried out (step S108).

In the first registration step S106, when the number of hops is utilized, the number of hops, which is conditions for generating a warning, contained in the specifying mode 132 is acquired and updated. That is, the predetermined value that is employed in the determination step S72 described in the section (3) Reception of the Information sending Response and Transmission of Warning Data is updated to a value specified in the specifying mode 132.

Figure 14:
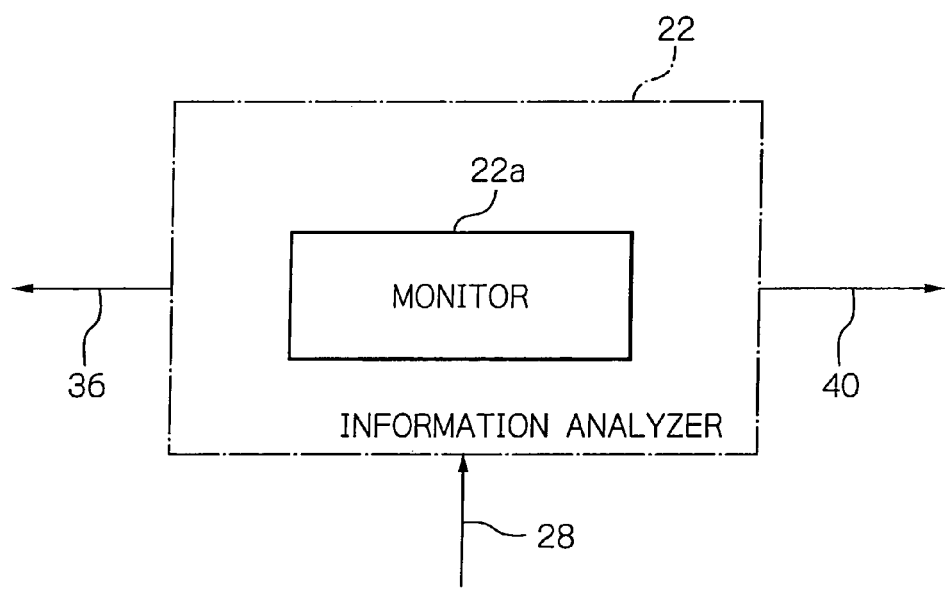
FIG. 14 is a schematic block diagram showing an alternative embodiment of the leadership support terminal used in the leadership support system of the present invention.

In the second registration step S108, when the number of pieces of terminal data is utilized, the number of terminals registered, which is conditions for generating a warning, contained in the specifying mode 132 is acquired and updated. That is, in the detection of a danger, the threshold value in the determination step S84, FIG. 14, is updated to a value specified in the specifying mode 132.

After step S106, the member terminal 12 outputs a danger of isolation based on the number of hops between the leader terminal 12 and the member terminal 12 at the step S110, which corresponds to the procedure shown in FIG. 12. The control thus proceeds to the step S74, and thereafter, through the connector I, the further procedure will be executed.

Figure 15:
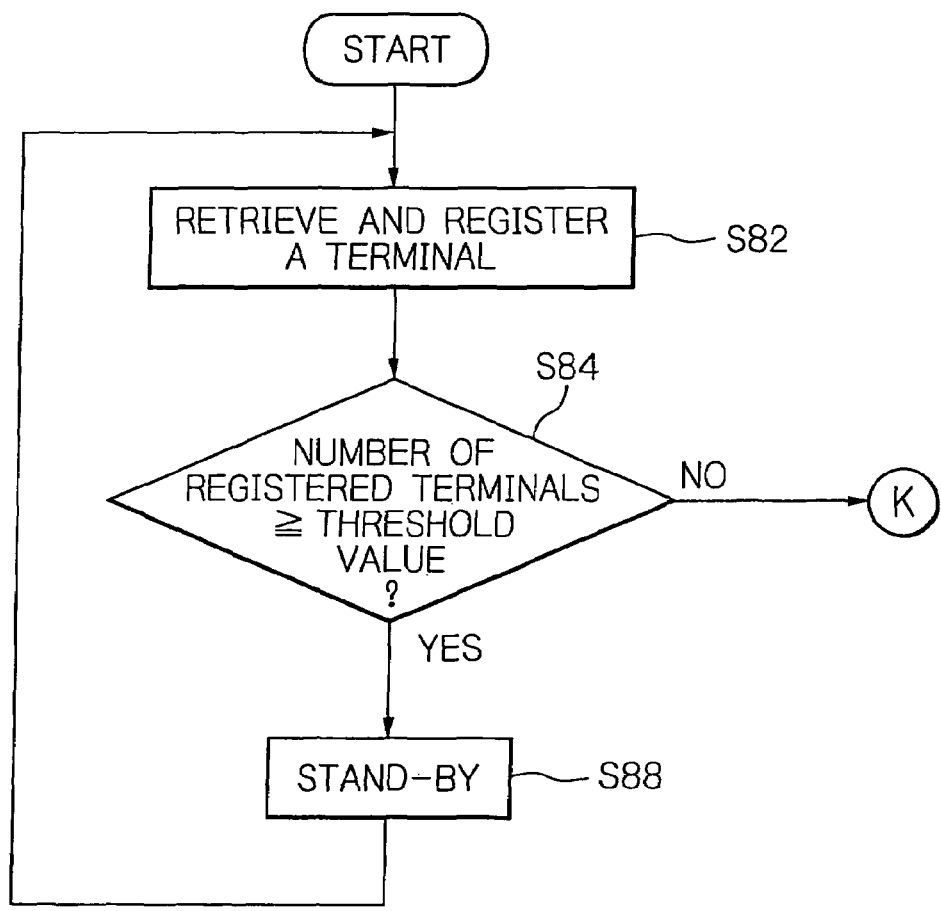
FIGS. 15 and 16 are flowcharts useful for understanding an operational procedure for the detection of a danger that is implemented in the alternative embodiment of the leadership support terminal shown in FIG. 14.

After step S108, the member terminal 12 outputs a danger of isolation based on the number of pieces of terminal data registered in that member terminal at the step S112, which is the same operation as the procedural step S82 shown in FIG. 15. In addition to the step S82, the system may be adapted to transmit the warning data 110 to the request source terminal ID contained in the received mode switching request 126, i.e. to the leader terminal 12.

Thus, the present alternative embodiment, in addition to the advantages of the preceding embodiments, is able to switch between the methods of detecting a danger of isolation. Consequently, for example, when the members stand in a line, or when the leader does not move but the members move freely, both the leader terminal 12 and the member terminal 12 can detect a danger of isolation. In addition, the reliability of system operation is improved, whereby the ability to suitably detect a danger of isolation can be increased.

In the preceding embodiments, for example, when two or more groups carrying the same leadership support terminals are present within the communication range and are mixed with each other at a tour spot, even if a member stands isolated from the group to which that member belongs, a warning of a danger of isolation will not be issued if communication is possible with the leadership support terminal 12 other than the group to which the member belongs. That is, since the leadership supervision system 10 grasps circumstances only by radio waves, it cannot issue a warning signal.

Figure 23:
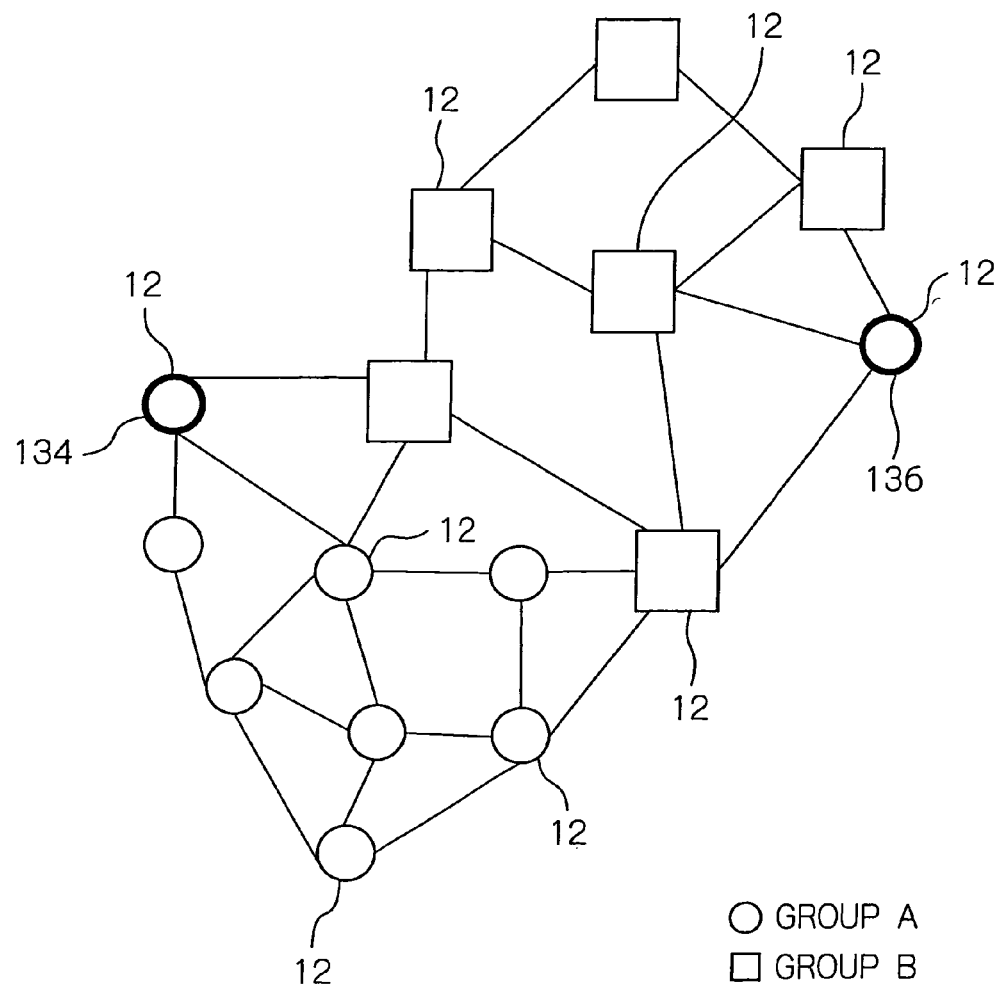
FIG. 23 schematically shows a network constituted by leadership support terminals in accordance with still another alternative embodiment of the present invention.

An instance of such a case will be described below. In FIG. 23, two moving networks are currently formed by terminals 12 (134 and 136) carried by the members of a group A indicated by circles, and terminals 12 carried by the members of a group B indicated by squares. In the two moving networks, although the leadership support terminal 12 (136) belongs to the group A, it communicates only with the leadership support terminal 12 belonging to the group B. In this situation, the leadership support terminal 136 is in high danger of isolation, but the preceding embodiments would send out no warning if either the number of hops or the number of registered terminals is less than the threshold value.

Hence, in the present alternative embodiment, when two or more groups use the leadership supervision system 10, the terminals are adapted to transmit the data terminal ID with the group ID added thereto. If it is detected that the data terminal ID containing the group ID is transmitted through a terminal belonging to another group, then a warning indicative of a danger of isolation is issued. That is, communication with another group is used as information for issuing a warning.

Figure 24:
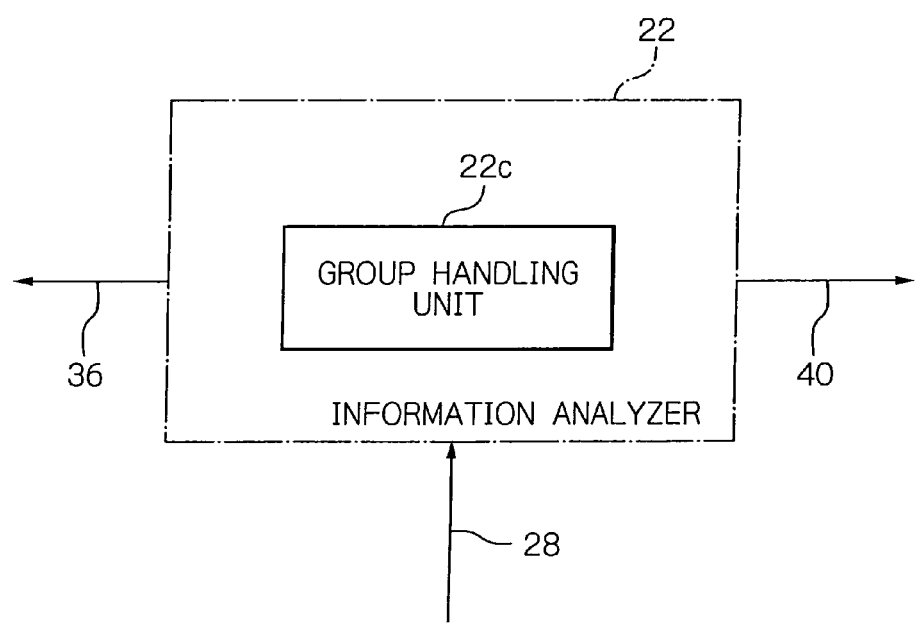
FIG. 24 is a schematic diagram showing an integral part of the leadership support terminal of FIG. 23.

The leadership support terminal 12 in the present alternative embodiment is basically made up of the components described above. In the alternative embodiment, the information analyzer 22, in addition to the above-described functions, handles the terminal IDs of all data containing a group ID that are transmitted and received, and as shown in FIG. 24, further includes a group handling unit 22c, which employs a group ID to detect a danger of isolation. The group ID in the present embodiment is used to uniquely identify a group such as a tour group. Users can set this group ID by manipulating the console panel 18.

With the above-described constitution, the leader terminal 12 in the present embodiment transmits an information sending request 88 at predetermined intervals in the same manner as described in the section (2-1) Transmission of Information Sending Request. The member terminal 12 that received this information sending request 88 performs either transmission or response of the information sending request 88 in the same manner as described in the section (2-2) Transfer, Reception, and Response of Information Sending Request.

Figure 25:
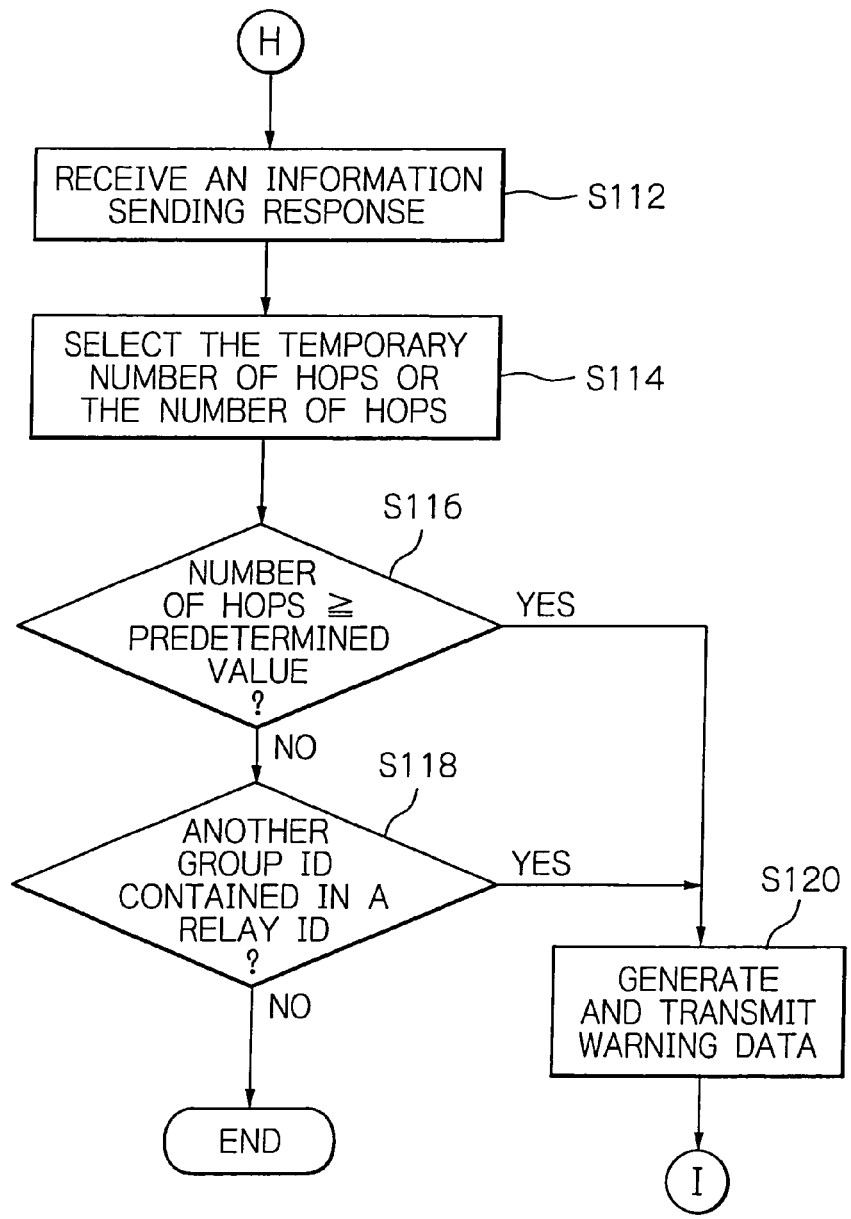
FIG. 25 is a flowchart useful for understanding an operational procedure for the reception of the information sending response and transmission of warning data that is implemented in the leadership support terminal shown in FIG. 23.

The leader terminal 12 receives an information sending response 104 transmitted from the member terminal 12, then determines a danger of isolation, and transmits warning data 110. This procedure will be described below with reference to FIG. 25.

The transmitter/receiver 16 of the leader terminal 12 receives the information sending response 104 transmitted from the member terminal 12 (step S112).

Next, the information analyzer 22 selects either the hop number in the received information sending response 104 or a temporary hop number (step S114). This selection is the same as the selection step S70 shown in FIG. 12.

Next, the information analyzer 22 determines whether or not the selected hop number is equal to or greater than a predetermined value (step S116). This determination process is the same as the determination step S72, FIG. 12. When the hop number is less than the predetermined value, a group determination step S118 will be executed. When it is equal to or greater than the predetermined value, a warning data transmission step S120 will be executed.

In the group determination step S118, the information of the relay terminal ID 96 is acquired from the received information sending response 104, and it is determined whether or not the group ID in the relay terminal ID 96 contains a group ID other than the group ID of this leader terminal 12. That is, it is determined whether or not this information sending response 104 has been transmitted via another group. When it is determined that the group ID in the relay terminal ID 96 does not contain a group ID other than the group ID of this leader terminal 12, it is determined that the information sending response 104 has not been transmitted via a terminal of another group, and the reception operation is finished.

When it is determined that the group ID in the relay terminal ID 96 contains a group ID other than the group ID of this leader terminal 12, i.e. when it is determined that the information sending response 104 has been transmitted via a terminal of another group, a warning data transmission step S120 is executed. In the warning data transmission step S120, warning data generated is transmitted to this mobile terminal as a destination terminal.

The transmitted warning data is transferred or received by the same operation as described in the section (4) Reception and Transfer of Warning Data in respect of the first embodiment, so that this member terminal 12 is informed of isolation-warning information.

With the operation described above, in the example shown in FIG. 23, by setting different group IDs to the member terminals of the group A and the member terminals of the group B, the leadership support terminal 134 is able to inform the leader support terminal 136 about isolation-warning information.

Although the present alternative embodiment is adapted to insert a group ID into the terminal ID and detect a danger of isolation by the same processing steps as described in respect to the first embodiment, the present invention is not to be interpreted as being limited to this specific method. For example, a danger of isolation may be detected by the same processing steps as shown in FIGS. 15 and 16. In this case, for example, for the group IDs contained in the terminal IDs registered in the data storage 24, either when there is no terminal data belonging to the group of interest, or when the number of pieces of terminal data belonging to the group of interest is equal to or less than a predetermined value, a warning may be issued. Besides, when the number of pieces of terminal data belonging to another group is greater than the number of pieces of terminal data belonging to the group of interest, a warning may be issued. In an embodiment in which the mode switching request is transmitted and received taking into consideration the form of a network to be configured, a group ID is contained in the terminal ID, and a danger of isolation may be detected by employing the group ID in the same way as the present alternative embodiment.

Thus, the present alternative embodiment, in addition to advantages described in the first embodiment, is capable of determining a situation where a danger of isolation is high and then sending out a warning, when two or more moving groups are mixed with each other.

While it has been described and illustrated with respect to the four embodiments that the leader and members of a tour group carry the leadership support terminals 12, the present invention is not to be interpreted as being limited to these specific embodiments. The present invention is also applicable to movement of groups other than the above-described type of tour group. In addition, in the above embodiments, although the leader and member terminals 12 are the same in construction, they may be different from each other in construction.

The entire disclosure of Japanese patent application No. 2007-37509 filed on Feb. 19, 2007, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A leadership support method in a wireless network of nodes, each of which comprises a leadership support terminal for relaying communication information for use in supervision of leadership, wherein at least one of the leadership support terminals is carried as a leader terminal by a leader of a group, and remaining ones of the leadership support terminals are carried as member terminals by members of the group, of which movement is supervised, said method comprising:

a first step of recording a plurality of pieces of terminal identification information of the member terminals in the leader terminal, and transmitting an information request contained in the communication information addressed to ones of the member terminals corresponding to the plurality of pieces of terminal identification information recorded in the leader terminal;

a second step of, in the member terminals, relaying the communication information not addressed to the member terminal or receiving the communication information addressed to the leader terminal, and sending back communication information containing an information response to the received communication information; and a third step of determining, in the leader terminal, based on a number of times of relaying the communication information, whether or not the member terminal that transmitted the communication information is in danger of isolation, and outputting, when the member terminal is determined to be in danger of isolation, a warning to the determined member terminal.

2. The method in accordance with claim 1, further comprising:

a fourth step of transmitting, in the leader terminal, mode switching information, which switches a relay number mode of determining on a basis of the number of times and a terminal number mode of determining on a basis of a number of member terminals having the terminal identification information recorded, and is addressed to the member terminals having the terminal identification recorded in the leader terminal;

a fifth step of executing, in the relay number mode, said first step, second step, and third step in order;

a sixth step of detecting, in the terminal number mode, one of the leadership support terminals which is directly communicable with another of the leadership support terminals; and a seventh step of determining, based on a number of directly communicable leadership support terminals detected, whether or not the other leadership support terminal is in danger of isolation, and outputting, when the other leadership support terminal is determined to be in danger of isolation, the warning to the determined leadership support terminal.

3. The method in accordance with claim 1, wherein in said first and second steps, identification information of the group is inserted into the communication information, and the communication information containing the identification information of the group is transmitted, and in said third step, it is determined, based on the number of times of relaying the communication information and the identification information of the group contained in the communication information, whether or not the member terminal that transmitted the communication information is in danger of isolation.

4. A leadership support system in a wireless network of nodes, each of which comprises a leadership support terminal for relaying communication information for use in supervision of leadership, wherein at least one of the leadership support terminals is carried as a leader terminal by a leader of a group, and remaining ones of the leadership support terminals are carried as member terminals by members of the group, of which movement is supervised, said leader terminal having a plurality of pieces of terminal identification information of said member terminals recorded, and transmitting an information request contained in the communication information addressed to said member terminals corresponding to the plurality of pieces of terminal identification information recorded in said leader terminal, said member terminal sending back a transmission response to the communication information according to relay of the communication information not addressed to said member terminal or reception of the communication information addressed to said member terminal, said leader terminal determining, based on a number of times of relaying the communication information, whether or not said member terminal that transmitted the communication information is in danger of isolation, and outputting a warning indicative of a danger of isolation.

5. The system in accordance with claim 4, wherein said leader terminal transmits mode switching information, which switches a relay number mode of determining on a basis of the number of times and a terminal number mode of determining on a basis of a number of member terminals having the terminal identification information recorded, and is addressed to said member terminals whose terminal identification information was recorded in the leader terminal, said leader terminal transmits the communication information addressed to said member terminals having the terminal identification information recorded according to the relay number mode indicated by the mode switching information, determines on a basis of the number of times whether or not said member terminal that transmitted the communication information is in danger of isolation, and outputs a warning indicative of a danger of isolation, said member terminal sends back, in the relay number mode indicated by the mode switching information, a transmission response to the communication information according to relay of the communication information not addressed to said member terminal or reception of the communication information addressed to said member terminal, and said leader terminal detects, in the terminal number mode indicated by the mode switching information, one of the member terminals which is directly communicable with another member terminal, determines, based on a number of directly communicable member terminals detected, whether or not said one member terminal is in danger of isolation, and outputs the warning indicative of the danger of isolation.

6. The system in accordance with claim 4, wherein said member terminal inserts identification information of the group into the communication information that is relayed, and transmits the communication information containing the identification information of the group, and said leader terminal inserts the identification information of the group in the leadership support terminal into the communication information and transmits the communication information containing the identification information of the group, determines, based on the number of times of relaying the communication information and the identification information of the group contained in the communication information, whether or not the member terminal that transmitted the communication information is in danger of isolation, and outputs the warning indicative of the danger of isolation.

* * * * *